US012756012B2

(12) United States Patent
Suzuki et al.

(10) Patent No.: US 12,756,012 B2
(45) Date of Patent: Oct. 6, 2026

(54) NONAQUEOUS ELECTROLYTIC SOLUTION AND NONAQUEOUS ELECTROLYTIC SOLUTION BATTERY

(71) Applicant: CENTRAL GLASS CO., LTD., Ube (JP)

(72) Inventors: Katsutoshi Suzuki, Saitama (JP); Arata Takahashi, Saitama (JP); Ryota Esaki, Yamaguchi (JP); Wataru Kawabata, Yamaguchi (JP); Toru Tanaka, Saitama (JP); Tsubasa Itakura, Saitama (JP); Takayoshi Morinaka, Yamaguchi (JP); Mikihiro Takahashi, Yamaguchi (JP); Shuji Harada, Saitama (JP)

(73) Assignee: CENTRAL GLASS CO., LTD., Ube (JP)

( * ) Notice: Subject to any disclaimer, the term of this patent is extended or adjusted under 35 U.S.C. 154(b) by 704 days.

(21) Appl. No.: 18/043,704

(22) PCT Filed: Aug. 31, 2021

(86) PCT No.: PCT/JP2021/032034
§ 371 (c)(1),
(2) Date: Mar. 1, 2023

(87) PCT Pub. No.: WO2022/050284
PCT Pub. Date: Mar. 10, 2022

(65) Prior Publication Data

US 2023/0275271 A1 Aug. 31, 2023

(30) Foreign Application Priority Data

Sep. 3, 2020 (JP) ................................ 2020-148320

(51) Int. Cl.
*H01M 10/0567* (2010.01)
*H01M 4/02* (2006.01)
*H01M 4/525* (2010.01)
*H01M 10/052* (2010.01)
*H01M 10/0568* (2010.01)
*H01M 10/0569* (2010.01)

(52) U.S. Cl.
CPC ....... *H01M 10/0567* (2013.01); *H01M 4/525* (2013.01); *H01M 10/052* (2013.01); *H01M 10/0568* (2013.01); *H01M 10/0569* (2013.01); *H01M 2004/028* (2013.01)

(58) Field of Classification Search
None
See application file for complete search history.

(56) References Cited

U.S. PATENT DOCUMENTS 11,539,078 B2 * 12/2022 Okumura ............. H01G 9/2004
2005/0244719 A1 * 11/2005 Kim .................. H01M 10/0567 429/313
2007/0224514 A1 9/2007 Kotato et al.
2009/0053612 A1 * 2/2009 Ihara ..................... C07C 309/86 429/340
2012/0034525 A1 2/2012 Satoh et al.
2014/0342246 A1 11/2014 Kim
2015/0086880 A1 3/2015 Ahn et al.
2016/0028124 A1 1/2016 Ihara et al.
2017/0187068 A1 6/2017 Morisawa et al.
2019/0237799 A1 8/2019 Kawasumi et al.
2020/0075996 A1 * 3/2020 Han .................. H01M 10/0567
2020/0335823 A1 10/2020 Takahashi et al.
2021/0159541 A1 * 5/2021 Jeong .................. H01M 10/052
2021/0296703 A1 * 9/2021 Sugawara ........... H01M 10/052
2025/0070226 A1 * 2/2025 Kwak ................. H01M 10/052
2025/0079516 A1 * 3/2025 Morinaka ............. H01M 4/661
2025/0158121 A1 * 5/2025 Tsay .................. H01M 10/0568

FOREIGN PATENT DOCUMENTS

| | | | |
|---|---|---|---|
| CN | 1943071 | 4/2007 | |
| CN | 101908642 | 12/2010 | |
| CN | 109891653 | 6/2019 | |
| CN | 110931872 A * | 3/2020 | .......... H01M 10/058 |
| CN | 111527636 | 8/2020 | |
| JP | H06-096769 | 4/1994 | |
| JP | 2006-049112 | 2/2006 | |
| JP | 2006-049152 | 2/2006 | |
| JP | 2007-165125 | 6/2007 | |
| JP | 2009-054288 | 3/2009 | |
| JP | 2009-054408 | 3/2009 | |
| JP | 2014-225430 | 12/2014 | |

(Continued)

OTHER PUBLICATIONS

Abstract Translation of CN-110931872-A (Year: 2020).*
International Search Report and Written Opinion of PCT/JP2021/032034, Oct. 12, 2021, 9 pages including English translation of the International Search Report.
The Extended European Search Report issued in EP 21864341.9, dated May 14, 2025, 8 pages.
Japanese Office Action issued in Japanese Patent Application 2022-546931, dated Dec. 23, 2025, 7 pages, English machine translation.
Chinese Office Action issued in CN Application No. 202180054390.9, dated Apr. 21, 2026, 39 pages, English machine translation.
Korean Office Action issued in KR Application No. 10-2023-7007423, dated Apr. 23, 2026, 20 pages, English machine translation.
Japanese Office Action issued in JP Application No. 2022-546931, mailed Aug. 4, 2026, 8 pages, English machine translation.

*Primary Examiner* — Kevin M Bernatz
(74) *Attorney, Agent, or Firm* — HSML P.C.

(57) ABSTRACT

The present disclosure is to provide a nonaqueous electrolytic solution for a nonaqueous electrolytic solution battery in which even if the nonaqueous electrolytic solution is applied to a positive electrode having a content of nickel of 30% by mass to 100% by mass in a metal contained in a positive electrode active material, an effect of improving output characteristics after cycle and an effect of reducing a deposition amount of a negative electrode current collector metal on a surface of a negative electrode after initial charging and discharging can be exerted in a well-balanced manner.

7 Claims, 8 Drawing Sheets

(56) References Cited

FOREIGN PATENT DOCUMENTS

| | | |
|---|---|---|
| JP | 2015-130286 | 7/2015 |
| JP | 2015-522933 | 8/2015 |
| JP | 2016-066481 | 4/2016 |
| JP | 2017-120765 | 7/2017 |
| JP | 2017-168347 | 9/2017 |
| JP | 2019-106362 | 6/2019 |
| JP | 2020-077575 | 5/2020 |
| JP | 2020-077576 | 5/2020 |
| JP | 2020-113492 | 7/2020 |
| KR | 10-2020-0090223 | 7/2020 |
| WO | 2010/113583 | 10/2010 |
| WO | 2020/026853 | 2/2020 |

* cited by examiner

NONAQUEOUS ELECTROLYTIC SOLUTION AND NONAQUEOUS ELECTROLYTIC SOLUTION BATTERY

TECHNICAL FIELD

The present disclosure relates to a nonaqueous electrolytic solution and a nonaqueous electrolytic solution battery.

BACKGROUND ART

Recently, electrical storage systems for information-related equipment or telecommunication equipment, i.e., electrical storage systems for equipment having a small size and requiring a high energy density, such as personal computers, video cameras, digital still cameras, and cellular phones, as well as electrical storage systems for equipment having a large size and requiring a high electric power, such as electric vehicles (EV), hybrid vehicles, auxiliary power supplies for fuel cell vehicles, and electricity storages, have been attracting attentions. As one candidate therefor, nonaqueous electrolytic solution batteries, such as lithium ion batteries, lithium batteries, lithium ion capacitors, and sodium ion batteries have actively been developed.

As measures for improving high-temperature characteristics of a nonaqueous electrolytic solution battery and battery characteristics (cycle characteristics, output characteristics) thereof when charging and discharging are repeated, optimization of various constituting elements of the battery including active materials of a positive electrode and a negative electrode has been hitherto studied. Techniques relating to a nonaqueous electrolytic solution are also no exception, and it has been proposed to use a variety of additives to prevent deterioration of the electrolytic solution at surfaces of the active positive and negative electrodes due to decomposition of the electrolytic solution. For example, as the measures for improving the high-temperature characteristics of the nonaqueous electrolytic solution battery and various battery characteristics (cycle characteristics) thereof when charging and discharging are repeated, addition of a salt having a phosphoryl group or a sulfonyl group to the electrolytic solution is also studied, and for example, it has been proposed that by adding a specific sulfone compound having a sulfonyl group (—$SO_2$—) and a fluorine group (—F), a decomposition reaction of the electrolytic solution is prevented, and the cycle characteristics and the high-temperature storage characteristics are improved (Patent Literature 1).

By the way, development of nonaqueous electrolytic solution batteries for EVs is being vigorously carried out in anticipation of the global rise of the EV market in the future. A battery capacity of the nonaqueous electrolytic solution battery for EV is directly linked to a cruising distance per charge. Therefore, increasing a capacity per weight (energy density) is a most important development problem.

As a measure for increasing the energy density of batteries, there is a method of using nickel oxide as a positive electrode active material. For example, Patent Literature 2 discloses a lithium ion secondary battery using $LiNiO_2$ as a positive electrode. In addition, Patent Literature 3 discloses a nonaqueous electrolytic secondary battery using a positive electrode containing a positive electrode active material mainly including a lithium composite oxide in which a ratio of nickel to a total number of moles of metal elements excluding lithium is 50 mol % or more.

Although the nickel oxide has a high theoretical capacity, thermal stability during charging is low, and at first, cobalt oxide, manganese oxide, iron phosphate, and the like are mainly used as positive electrode active materials. However, a demand for higher energy density in batteries is becoming more stringent, and cobalt is a concern for natural resource reserves, and thus, a ternary positive electrode "1:1:1" combining nickel, cobalt, and manganese has come to be used. For example, Patent Literature 4 discloses a positive electrode in which part of nickel is replaced with manganese, cobalt, or the like.

Regarding the ternary positive electrode, in order to further reduce the use of cobalt and to further increase a positive electrode capacity, development of a battery using a positive electrode with an increased nickel ratio has been actively carried out. It is well-known that in nickel-, cobalt-, and manganese-based positive electrodes, a ratio thereof is "3:1:1" or "8:1:1", and in a case of replacing manganese with aluminum, a nickel-cobalt-aluminum ratio is "8.5:1.0:0.5", "8.8:0.9:0.3", "9.0:0.5:0.5", or the like. For example, Patent Literature 5 discloses a lithium secondary battery including a positive electrode containing a positive electrode active material containing a nickel-based composite oxide represented by the following chemical formula:

$$LiNi_xCo_yMn_zO_2$$

($0.63 \le x \le 0.85$, $0.05 < y < 0.25$, $0.03 < z < 0.2$, $x+y+z=1$).

CITATION LIST

Patent Literature

Patent Literature 1: JP2009-054408A
Patent Literature 2: JPH06-096769A
Patent Literature 3: JP2017-120765A
Patent Literature 4: WO2010/113583
Patent Literature 5: JP2014-225430A

SUMMARY OF INVENTION

Technical Problem

When the electrolytic solution which is disclosed in Patent Literature 1 and has a composition with a relatively high sulfone compound concentration (for example, the electrolytic solution with a sulfone compound concentration of 2.0% by weight or more) is applied to a battery using a positive electrode having a content of nickel of 30% by mass to 100% by mass in a metal contained in a positive electrode active material with an aim of increasing a capacity of the battery, it was found that a current collector metal of a negative electrode is likely to be deposited on a negative electrode active material layer and a solid electrolytic interface (SEI) derived from an electrolytic and solvent formed on a surface of the negative electrode active material layer after initial charging and discharging. The deposition on the negative electrode active material layer and the SEI formed on the surface of the negative electrode active material layer (hereinafter, collectively referred to as "surface of the negative electrode") may inhibit diffusion of cations in the negative electrode, and thus, it is desirable to reduce a deposition amount.

Therefore, an object of the present disclosure is to provide a nonaqueous electrolytic solution in which even if the nonaqueous electrolytic solution is applied to a positive electrode having a content of nickel of 30% by mass to 100% by mass in a metal contained in a positive electrode active material, an effect of improving output characteristics after cycle and an effect of reducing a deposition amount of a negative electrode current collector metal on a surface of a negative electrode after initial charging and discharging can be exerted in a well-balanced manner, and to provide a nonaqueous electrolytic solution battery including the nonaqueous electrolytic solution, a negative electrode, and the positive electrode having the content of nickel of 30% by mass to 100% by mass in the metal contained in the positive electrode active material.

Solution to Problem

As a result of intensive studies by the present inventors in order to solve such problems, a nonaqueous electrolytic solution containing a nonaqueous solvent, a solute, and a predetermined concentrations of a compound represented by General Formula [1] described below is used, so that in a nonaqueous electrolytic solution battery including a positive electrode having a content of nickel of 30% by mass to 100% by mass in a metal contained in a positive electrode active material, an effect of improving output characteristics after a cycle and an effect of reducing a deposition amount of a negative electrode current collector metal on a negative electrode surface after initial charging and discharging can also be exerted in a well-balanced manner.

A nonaqueous electrolytic solution according to the present disclosure is a nonaqueous electrolytic solution for a nonaqueous electrolytic solution battery including: a positive electrode that contains an oxide containing at least nickel as a positive electrode active material and has a content of nickel of 30% by mass to 100% by mass in a metal contained in the positive electrode active material, the nonaqueous electrolytic solution including:

(I) a nonaqueous solvent;

(II) a solute; and (III) a compound represented by General Formula [1], in which a content of (III) is 0.001% by mass to 1.8% by mass with respect to 100% by mass of a total amount of (I) to (III), $$R(SO_2X)_m \quad [1]$$

[R represents monovalent to tetravalent groups containing at least one carbon atom, and the group may contain at least one selected from the group consisting of hydrogen atoms, halogen atoms, unsaturated bonds, aromatic rings, oxygen atoms, and ester bonds. X represents a halogen atom or a linear or branched perfluoroalkyl group having 1 to 10 carbon atoms. m represents an integer of 1 to 4. When m represents an integer of 2 to 4, a plurality of X may be the same or different.].

Examples of the monovalent to tetravalent groups containing at least one carbon atom represented by R in General Formula [1] include a carbon atom, C═C, a hydrocarbon group, and groups in which at least one hydrogen atom of the hydrocarbon group is replaced with at least one selected from the group consisting of halogen atoms, unsaturated bonds, aromatic rings, oxygen atoms, and ester bonds.

Examples of the compound represented by General Formula [1] include:

compounds in which when the above R group is a monovalent hydrocarbon group, the R group includes a methyl group, an ethyl group, a vinyl group, an isopropyl group, a benzyl group, a group represented by $—CH_2—C(═O)OR^2$, a group represented by $—CH\{—C(═O)OR^2\}_2$ ($R^2$ is an alkyl group having 1 to 4 carbon atoms) (hydrogen atoms of those groups may be partially or wholly substituted with fluorine atoms), or the like, and X group includes fluorine atoms, chlorine atoms, bromine atoms, a trifluoromethyl group, a pentafluoroethyl group, a heptafluoropropyl group, a nonafluorobutyl group, or the like.

In addition, examples of the compound include one in which when the above R group is a divalent or higher hydrocarbon group, the hydrogen atoms in the R group in the above "when the R group is a monovalent hydrocarbon group" is partially or wholly substituted with a group represented by ($—SO_2X$).

The above hydrocarbon group may contain at least one selected from the group consisting of halogen atoms, unsaturated bonds, aromatic rings, oxygen atoms, and ester bonds.

In the above nonaqueous electrolytic solution, the content of (III) with respect to 100% by mass of the total amount of (I) to (III) is preferably 0.007% by mass to 1.4% by mass because an effect of improving output characteristics after cycle and an effect of reducing a deposition amount of a negative electrode current collector metal on a surface of a negative electrode after initial charging and discharging can be exerted in a more balanced manner.

In addition, in the above nonaqueous electrolytic solution, the above (III) is preferably at least one selected from the group consisting of compounds represented by the following General Formulas [2] to [4], and in particular, (III) is preferably a compound represented by the following General Formula [2], $$C(R^1)_{4-a}(SO_2X)_a \quad [2]$$

[$R^1$ represents a group selected from a hydrogen atom, a fluorine atom, a linear alkyl group having 1 to 10 carbon atoms, a branched alkyl group having 3 to 10 carbon atoms, an alkenyl group having 2 to 10 carbon atoms, an alkynyl group having 2 to 10 carbon atoms, a cycloalkyl group having 3 to 10 carbon atoms, a cycloalkenyl group having 3 to 10 carbon atoms, an aryl group having 6 to 10 carbon atoms, a linear alkoxy group having 1 to 10 carbon atoms, a branched alkoxy group having 3 to 10 carbon atoms, an alkenyloxy group having 2 to 10 carbon atoms, an alkynyloxy group having 2 to 10 carbon atoms, a cycloalkoxy group having 3 to 10 carbon atoms, a cycloalkenyloxy group having 3 to 10 carbon atoms, an aryloxy group having 6 to 10 carbon atoms, and a group represented by $—C(═O)OR^2$ ($R^2$ represents an alkyl group having 1 to 4 carbon atoms), and at least one selected from the group consisting of fluorine atoms, oxygen atoms, and unsaturated bonds may be present in the groups. X represents a halogen atom or a linear or branched perfluoroalkyl group having 1 to 10 carbon atoms. a represents an integer of 1 to 4, and when a is set to 1 or 2, a plurality of $R^1$ may be the same or different. When a represents an integer of 2 to 4, a plurality of X may be the same or different. Also, the carbon atom "C" and $R^1$ may form a multiple bond.]

$$(SO_2X)_b(R^3)_{3-b}C—C(R^3)_{3-c}(SO_2X)_c \quad [3]$$

[$R^3$ represents a group selected from a hydrogen atom, a fluorine atom, a linear alkyl group having 1 to 10 carbon atoms, a branched alkyl group having 3 to 10 carbon atoms, an alkenyl group having 2 to 10 carbon atoms, an alkynyl group having 2 to 10 carbon atoms, a cycloalkyl group having 3 to 10 carbon atoms, a cycloalkenyl group having 3 to 10 carbon atoms, an aryl group having 6 to 10 carbon atoms, a linear alkoxy group having 1 to 10 carbon atoms, a branched alkoxy group having 3 to 10 carbon atoms, an alkenyloxy group having 2 to 10 carbon atoms, an alkynyloxy group having 2 to 10 carbon atoms, a cycloalkoxy group having 3 to 10 carbon atoms, a cycloalkenyloxy group having 3 to 10 carbon atoms, and an aryloxy group having 6 to 10 carbon atoms, and at least one selected from the group consisting of fluorine atoms, oxygen atoms, and unsaturated bonds may be present in the groups. A plurality of $R^3$ may be the same or different. X represents a halogen atom or a linear or branched perfluoroalkyl group having 1 to 10 carbon atoms. A plurality of X may be the same or different. b is set to 1 or 2. c is set to 1 or 2.]

$$(SO_2X)_d(R^4)_{2-d}C{=}C(R^4)_{2-e}(SO_2X)_e \quad [4]$$

[$R^4$ represents a group selected from a hydrogen atom, a fluorine atom, a linear alkyl group having 1 to 10 carbon atoms, a branched alkyl group having 3 to 10 carbon atoms, an alkenyl group having 2 to 10 carbon atoms, an alkynyl group having 2 to 10 carbon atoms, a cycloalkyl group having 3 to 10 carbon atoms, a cycloalkenyl group having 3 to 10 carbon atoms, an aryl group having 6 to 10 carbon atoms, a linear alkoxy group having 1 to 10 carbon atoms, a branched alkoxy group having 3 to 10 carbon atoms, an alkenyloxy group having 2 to 10 carbon atoms, an alkynyloxy group having 2 to 10 carbon atoms, a cycloalkoxy group having 3 to 10 carbon atoms, a cycloalkenyloxy group having 3 to 10 carbon atoms, and an aryloxy group having 6 to 10 carbon atoms, and at least one selected from the group consisting of fluorine atoms, oxygen atoms, and unsaturated bonds may be present in the groups. X represents a halogen atom or a linear or branched perfluoroalkyl group having 1 to 10 carbon atoms. A plurality of X may be the same or different. d is set to 1 or 2. e is set to 1 or 2. When both d and e are set to 1, a plurality of $R^4$ may be the same or different.].

In the above nonaqueous electrolytic solution, the above (III) is preferably at least one selected from the group consisting of compounds represented by the following (1-1) to (1-22), and particularly preferably the compounds represented by (1-1) and (1-21) below.

[Formula 1]

(1-1)

(1-2)

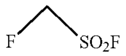

(1-3)

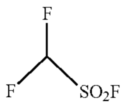

(1-4)

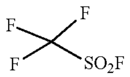

(1-5)

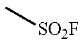

(1-6)

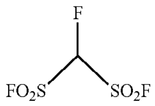

(1-7)

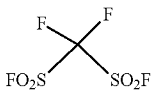

-continued (1-8)

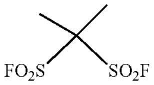

(1-9)

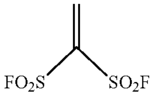

(1-10)

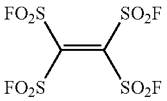

(1-11)

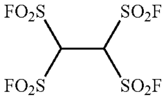

(1-12)

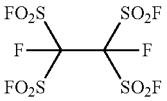

(1-13)

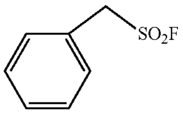

(1-14)

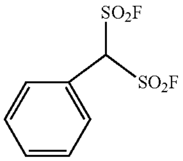

(1-15)

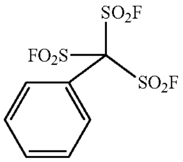

(1-16)

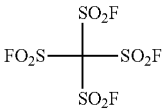

(1-17)

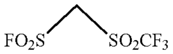

(1-18)

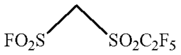

(1-19)

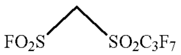

(1-20)

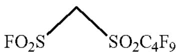

(1-21)

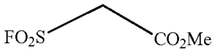

-continued (1-22)

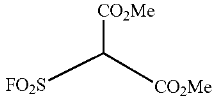

(In Formula 1, Me represents a methyl group.)

In addition, the above nonaqueous electrolytic solution preferably contains at least one selected from the group consisting of lithium bis(oxalato)borate, lithium difluoro oxalato borate, lithium tris(oxalato)phosphate, lithium difluorobis(oxalato)phosphate, and lithium tetrafluoro oxalato phosphate. From a viewpoint of suppressing an amount of gas generated during initial charging, it is more preferable to contain at least one selected from the group consisting of lithium bis(oxalato)borate, lithium difluoro oxalato borate, and lithium tetrafluoro oxalato phosphate. In addition, from viewpoints of improving output characteristics after cycle and suppressing the amount of gas generated during the initial charging, it is particularly preferable to contain at least one selected from the group consisting of lithium difluoro oxalato borate and lithium tetrafluoro oxalato phosphate.

The nonaqueous electrolytic solution battery of the present disclosure is a nonaqueous electrolytic solution battery (hereafter, it may simply be described as the "nonaqueous battery" or the "battery") which includes a positive electrode that contains an oxide containing at least nickel as a positive electrode active material and has the content of nickel of 30% by mass to 100% by mass in the metal contained in the positive electrode active material, a negative electrode, and any one of the above nonaqueous electrolytic solutions.

Advantageous Effects of Invention

The present disclosure can provide a nonaqueous electrolytic solution in which even if the nonaqueous electrolytic solution is applied to a positive electrode having a content of nickel of 30% by mass to 100% by mass in a metal contained in a positive electrode active material, an effect of improving output characteristics after cycle and an effect of reducing a deposition amount of a negative electrode current collector metal on a surface of a negative electrode after initial charging and discharging can be exerted in a well-balanced manner, and to provide a nonaqueous electrolytic solution battery including the nonaqueous electrolytic solution, the negative electrode, and the positive electrode having the content of nickel of 30% by mass to 100% by mass in the metal contained in the nonaqueous electrolytic solution and the positive electrode active material.

DESCRIPTION OF EMBODIMENTS

1. Nonaqueous Electrolytic Solution

Figure 1:
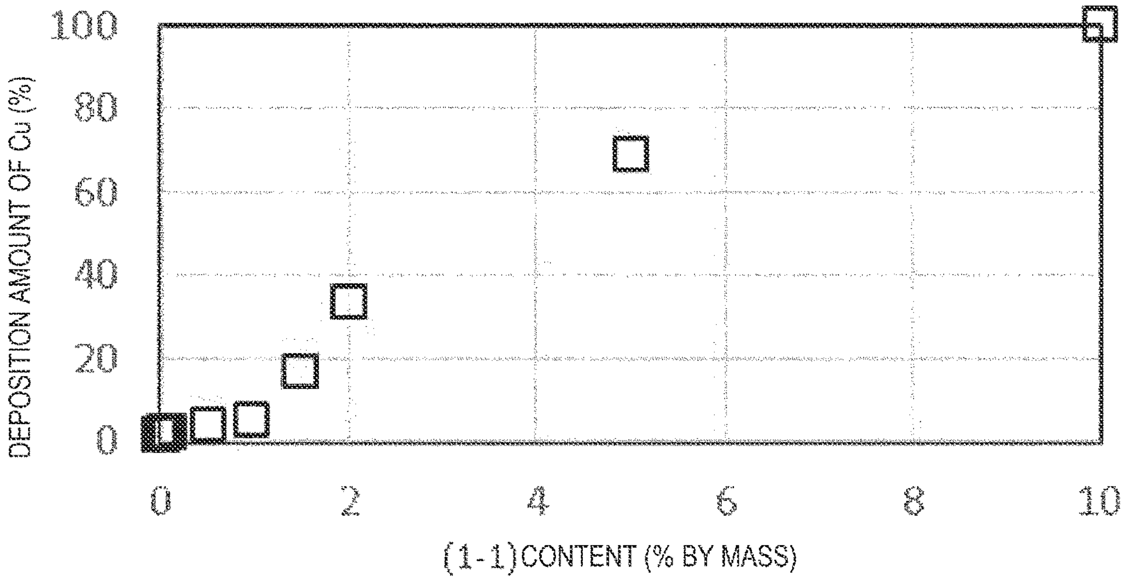
FIG. 1 shows a deposition amount of a negative electrode current collector metal (Cu) on a surface of a negative electrode with respect to a content of Compound (1-1) as a (III) component (Examples 1-1 to 1-7 and Comparative Examples 1-1 to 1-4).

A nonaqueous electrolytic solution according to the present disclosure is a nonaqueous electrolytic solution for a nonaqueous electrolytic solution battery including a positive electrode which contains an oxide containing at least nickel as a positive electrode active material and has a content of nickel of 30% by mass to 100% by mass in a metal contained in the positive electrode active material, the nonaqueous electrolytic solution including:

(I) a nonaqueous solvent;

(II) a solute; and (III) a compound represented by the above General Formula [1], in which a content of (III) is 0.001% by mass to 1.8% by mass with respect to 100% by mass of a total amount of (I) to (III), Regarding (III) Compound Represented by General Formula [1]

It is important that the nonaqueous electrolytic solution contains the above (III) component. By containing the component, output characteristics after cycle can be improved when the nonaqueous electrolytic solution battery is formed.

Although a reason why the output characteristics after above cycle are improved is not clear, it is believed that the (III) component reacts with an active portion on a surface of a positive electrode during a first cycle of charging to form a stable coating on the surface of the positive electrode. This coating layer inhibits desorption of oxygen from a positive electrode structure, and reduces NiO formed on the surface of the positive electrode and Ni deposited on a surface of a negative electrode, and as a result, it is presumed that the output characteristics are improved by preventing an increase in a resistance of an electrode interface.

It is important that a content of (III) is set to 0.001% by mass to 1.8% by mass with respect to 100% by mass of a total amount of (I) to (III). By setting the content within the above range, an effect of improving the output characteristics after cycle and an effect of reducing a deposition amount of a negative electrode current collector metal on the surface of the negative electrode after initial charging and discharging can be exerted in a well-balanced manner.

The compound represented by General Formula [1] used as (III) may be of one type or two or more types. When two or more types of the compounds represented by General Formula [1] are used, a total amount of the compounds represented by General Formula [1] is set to 0.001% by mass to 1.8% by mass with respect to 100% by mass of the total amount of (I) to (III).

From a viewpoint of the effect of reducing the deposition amount of the negative electrode current collector metal on the surface of the negative electrode after the initial charging and discharging, an upper limit of the content range of (III) is preferably 1.4% by mass. The above upper limit may be less than 1.0% by mass, less than 0.5% by mass, or less than 0.01% by mass.

A lower limit of the content range of (III) with respect to 100% by mass of the total amount of (I) to (III) is preferably 0.007% by mass from a viewpoint of the effect of improving the output characteristics after cycle, is more preferably 0.03% by mass from a viewpoint of the effect of improving a capacity retention rate after cycle, and is particularly preferably 0.07% by mass from viewpoints of the effect of improving the output characteristics after cycle and an effect of reducing a resistance value.

Specifically, the (III) component is preferably at least one selected from the group consisting of compounds represented by General Formulas [2] to [4], and is particularly preferably a compound represented by the above General Formula [2] from viewpoints of production costs and output characteristics.

Specific examples of the (III) component include compounds such as the above Compounds (1-1) to (1-22). The present disclosure is, of course, not limited by these specific examples. The (III) component is preferably at least one selected from the group consisting of the compounds represented by the above Compounds (1-1) to (1-22). The (III) component is preferably at least one selected from the group consisting of the above Compounds (1-1) and (1-17) to (1-22) from the viewpoints of the production cost and the output characteristics, and is particularly preferably at least one selected from the group consisting of Compounds (1-1) and (1-21).

Regarding (I) Nonaqueous Solvent and (II) Solute

The solute is not particularly limited, and any salt consisting of a pair of cation and anion can be used. Specific examples of the cation include alkali metal ions such as lithium ions, sodium ions, and potassium ions, alkaline earth metal ions, and quaternary ammonium ions, and specific examples of the anion include hexafluorophosphoric acid, tetrafluoroboric acid, perchloric acid, hexafluoroarsenic acid, hexafluoroantimonic acid, trifluoromethanesulfonic acid, bis(trifluoromethanesulfonyl)imide, bis(pentafluoroethanesulfonyl)imide, (trifluoromethanesulfonyl)(pentafluoroethanesulfonyl)imide, bis(fluorosulfonyl)imide, (trifluoromethanesulfonyl)(fluorosulfonyl)imide, (pentafluoroethanesulfonyl)(fluorosulfonyl)imide, tris(trifluoromethanesulfonyl)methide, and bis(difluorophosphonyl)imide anions. One type of these electrolytes may be used alone, or two or more types may be mixed and used in any combination and any ratio according to an application. Among the above, considering an energy density, output characteristics, life, and the like of a battery, the cation is preferably a lithium, sodium, magnesium, or quaternary alkylammonium cation, and the anion is preferably a hexafluorophosphoric acid, tetrafluoroboric acid, bis(trifluoromethanesulfonyl)imide, bis(fluorosulfonyl)imide, or bis(difluorophosphonyl)imide anion.

More specifically, the solute is preferably at least one solute selected from the group consisting of lithium hexafluorophosphate ($LiPF_6$), lithium tetrafluoroborate ($LiBF_4$), lithium bis(trifluoromethanesulfonyl)imide ($LiN(CF_3SO_2)_2$), lithium bis(fluorosulfonyl)imide ($LiN(FSO_2)_2$), lithium bis(difluorophosphoryl)imide ($LiN(POF_2)_2$), sodium hexafluorophosphate ($NaPF_6$), sodium tetrafluoroborate ($NaBF_4$), sodium bis(trifluoromethanesulfonyl)imide ($NaN(CF_3SO_2)_2$), sodium bis(fluorosulfonyl)imide ($NaN(FSO_2)_2$), and sodium bis(difluorophosphoryl)imide ($NaN(POF_2)_2$).

The nonaqueous solvent is not particularly limited as long as the nonaqueous solvent can dissolve at least one selected from the group consisting of the (II) solute and the (III) compound represented by General Formula [1], and for example, can use carbonates, esters, ethers, lactones, nitriles, imides, sulfone compounds, sulfoxide compounds, and ionic liquids. Among the above, at least one nonaqueous solvent selected from the group consisting of cyclic carbonates, chain carbonates, cyclic esters, chain esters, cyclic ethers, chain ethers, sulfone compounds, sulfoxide compounds, and ionic liquids is preferred. Moreover, not only a single solvent but also a mixed solvent of two or more kinds may be used.

Specific examples of the nonaqueous solvents may include ethyl methyl carbonate (hereinafter, also described as "EMC"), dimethyl carbonate (hereinafter, also described as "DMC"), diethyl carbonate (hereinafter, also described as "DEC"), methyl propyl carbonate, ethyl propyl carbonate, methyl butyl carbonate, ethylene carbonate (hereinafter, also described as "EC"), propylene carbonate (hereinafter, also described as "PC"), butylene carbonate, methyl acetate, ethyl acetate, methyl propionate, ethyl propionate, diethyl ether, acetonitrile, propionitrile, tetrahydrofuran, 2-methyltetrahydrofuran, furan, tetrahydropyran, 1,3-dioxane, 1,4-dioxane, dibutyl ether, diisopropyl ether, 1,2-dimethoxyethane, N,N-dimethylformamide, dimethylsulfoxide, sulfolane, γ-butyrolactone, and γ-valerolactone.

The nonaqueous solvent preferably contains at least one selected from the group consisting of cyclic carbonates and chain carbonates. Examples of the cyclic carbonates include EC and PC, and examples of the chain carbonates include EMC, DMC, DEC, and methyl propyl carbonate.

When the nonaqueous solvent is used as an electrolytic medium, it is generally referred to as a nonaqueous electrolytic solution, and when a polymer is used, it is referred to as a polymer solid electrolyte. The polymer solid electrolyte includes one containing the nonaqueous solvent as a plasticizer.

An electrochemical device is referred to as a nonaqueous electrolytic solution battery, the electrochemical device using the nonaqueous electrolytic solution, a negative electrode material that can reversibly intercalate and deintercalate alkali metal ions such as lithium ions and sodium ions, or alkaline earth metal ions, and a positive electrode material that can reversibly intercalate and deintercalate alkali metal ions such as lithium ions and sodium ions, or alkaline earth metal ions.

When producing a polymer solid electrolyte using the nonaqueous electrolytic solution according to the present disclosure, the polymer to be used is not particularly limited as long as the polymer can dissolve the above (II) and (III) component. Examples of the polymer include polymers having polyethylene oxide as a main chain or a side chain, homopolymers or copolymers of polyvinylidene fluoride, methacrylic acid ester polymers, and polyacrylonitrile. These polymers may contain the above nonaqueous solvent, for example as the plasticizer.

A concentration of the solute in the nonaqueous electrolytic solution according to the present disclosure is not particularly limited, but a lower limit is preferably 0.5 mol/L or more, more preferably 0.7 mol/L or more, and furthermore preferably 0.9 mol/L, and an upper limit is preferably 5.0 mol/L or less, more preferably 4.0 mol/L or less, and furthermore preferably 2.0 mol/L or less. If the concentration is 0.5 mol/L or more, ionic conductivity is less likely to decrease, so that cycle characteristics and the output characteristics of the nonaqueous electrolytic solution battery are less likely to decrease, whereas if the concentration is 5.0 mol/L or less, a viscosity of the nonaqueous electrolytic solution does not easily increase, so that the ionic conductivity is also less likely to decrease, and there is no risk of deteriorating the cycle characteristics and the output characteristics of the nonaqueous electrolytic solution battery.

During the production of the nonaqueous electrolytic solution according to the present disclosure, from a viewpoint of preventing the deterioration of the nonaqueous electrolytic solution, it is effective to prevent a temperature of the solution from exceeding 40° C. when dissolving the above solute. When the solute dissolves, the solute reacts with moisture in a system and decomposes, which can prevent the generation of free acids such as hydrogen fluoride (HF), and as a result, the decomposition of the nonaqueous solvent can be prevented. Addition of the solute little by little for the dissolution and preparation is also effective from a viewpoint of preventing the production of free acids such as HF.

For example, it is preferable that 10% by mass to 35% by mass of the total solutes is first added and dissolved in the nonaqueous solvent, and then the operation in which 10% by mass to 35% by mass of the total solutes is added and dissolved is performed 2 to 9 times, and finally, the remaining solute is gradually added and dissolved, and the above dissolving operation is operated while a liquid temperature is kept not exceeding 40° C.

Regarding Another Additive

An additive commonly used in the nonaqueous electrolytic solution according to the present disclosure may be added in any ratio as long as the gist of the present disclosure is not impaired. Specific examples include compounds which have an overcharge prevention effect, a negative electrode coating-forming effect, and a positive electrode protective effect, the compounds including lithium bis(oxalato)borate, lithium difluoro oxalato borate, lithium tris(oxalato)phosphate, lithium difluorobis(oxalato)phosphate, lithium tetrafluoro oxalato phosphate, carbonate compounds as shown in the following (2-1) to (2-12), 4-fluorobiphenyl, fluorobenzene, 1,3-difluorobenzene, and difluoroanisole, 1,3-propanesultone, 1,3-propenesultone, methylene methanedisulfonate, dimethylene methanedisulfonate, trimethylene methanedisulfonate, cyclic phosphazene compounds, aromatic compounds, and the like. In addition, as in the case of the nonaqueous electrolytic solution battery referred to as a polymer battery, the nonaqueous electrolytic solution can be quasi-solidified with a gelling agent or a cross-linked polymer.

[Formula 2]

(2-1)

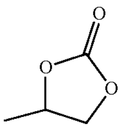

(2-2)

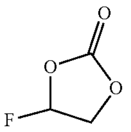

(2-3)

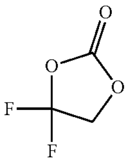

(2-4)

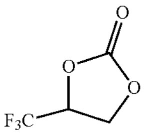

(2-5)

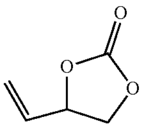

-continued (2-6)

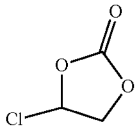

(2-7)

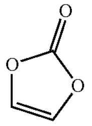

(2-8)

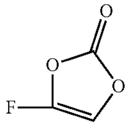

(2-9)

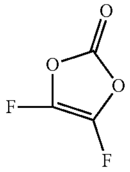

(2-10)

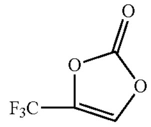

(2-11)

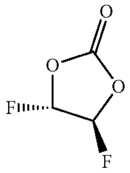

(2-12)

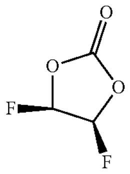

Among the above compounds, from the viewpoint of improving the output characteristics after cycle, another additive is preferable to include at least one selected from the group consisting of lithium bis(oxalato)borate, lithium difluoro oxalato borate, lithium tris(oxalato)phosphate, lithium difluorobis(oxalato)phosphate, and lithium tetrafluoro oxalato phosphate. Among the above oxalato salts, lithium bis(oxalato)borate, lithium difluoro oxalato borate, and lithium tetrafluoro oxalato phosphate are particularly preferable from a viewpoint of suppressing the amount of gas generated during the initial charging. Lithium difluoro oxalato borate and lithium tetrafluoro oxalato phosphate are most preferable from the viewpoints of improving the output characteristics after the cycle and suppressing an amount of gas generated during the initial charging.

A content of another additive in the nonaqueous electrolytic solution is preferably 0.01% by mass or more and 5.0% by mass or less with respect to the total amount of the nonaqueous electrolytic solution.

2. Nonaqueous Electrolytic Solution Battery

The nonaqueous electrolytic solution battery according to the present disclosure at least includes (a) the nonaqueous electrolytic solution described above, (b) the positive electrode, and (c) the negative electrode. Furthermore, it is preferable to include (d) a separator, an exterior body, and the like.

[(b) Positive Electrode]

(b) The positive electrode contains an oxide containing at least nickel as the positive electrode active material, and the content of nickel in the metal contained in the positive electrode active material is 30% by mass to 100% by mass.

[Positive Electrode Active Material]

In a case of a lithium ion secondary battery in which cations in the nonaqueous electrolytic solution are mainly lithium, the (b) positive electrode active material constituting the positive electrode is not particularly limited as long as the positive electrode active material is a material that can be charged and discharged, and examples of the positive electrode active material include those having containing at least one selected from the group consisting of, for example, (A) a lithium-transition metal composite oxide having a layered structure and containing nickel or one or more metals selected from the group consisting of manganese, cobalt, and aluminum in addition to nickel, (B) a nickel-containing lithium-manganese composite oxide having a spinel structure, and (C) a nickel-containing lithium-rich layered transition metal oxide having a layered rocksalt structure.

((A) Lithium-Transition Metal Composite Oxide)

Regarding the (A) lithium-transition metal composite oxide having a layered structure and containing nickel or one or more metals selected from the group consisting of manganese, cobalt, and aluminum in addition to nickel, examples of the (A) lithium-transition metal composite oxide include lithium-nickel composite oxides, lithium-nickel-cobalt composite oxides, lithium-nickel-manganese composite oxides, and lithium-nickel-manganese-cobalt composite oxides. A part of transition metal atoms that are main components of these lithium-transition metal composite oxides may be substituted with other elements such as Al, Ti, V, Cr, Fe, Cu, Zn, Mg, Ga, Zr, Si, B, Ba, Y, and Sn.

Specific examples of the lithium-nickel composite oxide include $LiNiO_2$, lithium nickelate to which different elements such as Mg, Zr, Al, and Ti are added, and one in which particle surfaces of $LiNiO_2$ particles are partly coated with aluminum oxide.

The lithium-nickel-cobalt composite oxide and a composite oxide obtained by substituting a part of nickel-cobalt with Al or the like are represented by General Formula [1-1].

$$Li_aNi_{1-b-c}Co_bM^1_cO_2 \quad [1\text{-}1]$$

In Formula [1-1], $M^1$ represents at least one element selected from the group consisting of Al, Fe, Mg, Zr, Ti, and B, a satisfies a condition of $0.9 \leq a \leq 12$, and b and c satisfy conditions of $0.1 \leq b \leq 0.3$ and $0 \leq c \leq 0.1$.

These can be prepared, for example, according to a production method described in JP2009-137834A. Specific examples include $LiNi_{0.8}Co_{0.2}O_2$, $LiNi_{0.85}Co_{0.10}Al_{0.05}O_2$, $LiNi_{0.87}Co_{0.10}Al_{0.03}O_2$, and $LiNi_{0.6}Co_{0.3}Al_{0.1}O_2$.

Specific examples of the lithium-nickel-manganese composite oxide include $LiNi_{0.5}Mn_{0.5}O_2$.

The lithium-nickel-manganese-cobalt composite oxide and the composite oxide in which part of nickel-manganese-cobalt is substituted with Al or the like include lithium-containing composite oxides represented by General Formula [1-2].

$$Li_aNi_eMn_fCo_gM^2_hO_2 \quad [1\text{-}2]$$

In Formula [1-2], $M^2$ represents at least one element selected from the group consisting of Al, Fe, Mg, Zr, Ti, B, and Sn, d satisfies a condition of $0.9 \leq d \leq 1.2$, and e, f, g, and h satisfy conditions of $e+f+g+h=1$, $0 \leq e \leq 0.8.7$, $0 \leq f \leq 0.5$, $0 \leq g \leq 0.5$, and $h \geq 0$.

The lithium-nickel-manganese-cobalt composite oxide preferably contains manganese within the range shown in General Formula [1-2] in order to improve structural stability and improve safety at high temperatures in a lithium secondary battery, and in particular, preferably contains cobalt within the range represented by the General Formula [1-2] in order to improve high rate characteristics of the lithium ion secondary battery.

Specific examples include $Li[Ni_{13}Mn_{1/3}Co_{1/3}]O_2$, $Li[Ni_{0.45}Mn_{0.35}Co_{0.2}]O_2$, $Li[Ni_{0.5}Mn_{0.3}Co_{0.2}]O_2$, $Li[Ni_{0.6}Mn_{0.2}Co_{0.2}]O_2$, $Li[Ni_{0.8}Mn_{0.1}Co_{0.1}]O_2$, $Li[Ni_{0.49}Mn_{0.3}Co_{0.2}Zr_{0.01}]O_2$, $Li[Ni_{0.49}Mn_{0.3}Co_{0.2}Mg_{0.01}]O_2$, which have a charging and discharging region at 4.3 V or more.

((B) Nickel-Containing Lithium-Manganese Composite Oxide Having Spinel Structure)

Examples of the (B) lithium-manganese composite oxide having the spinel structure, which is an example of the positive electrode active material, include spinel-type lithium-manganese composite oxides represented by General Formula [1-3].

$$Li_j(Mn_{2-k}M^3{}_k)O_4 \quad [1\text{-}3]$$

In Formula [1-3], $M^3$ contains Ni and may contain at least one metal element selected from the group consisting of Co, Fe, Mg, Cr, Cu, Al, and Ti. j satisfies $1.05 \leq j \leq 1.15$ and k satisfies $0 < k \leq 0.50$.

Specific examples include $LiMn_{1.9}Ni_{0.1}O_4$ and $LiMn_{1.5}Ni_{0.5}O_4$.

((C) Nickel-Containing Lithium-Rich Layered Transition Metal Oxide)

Examples of the (C) nickel-containing lithium-rich layered transition metal oxide having the layered rocksalt structure, which is an example of the positive electrode active material, include those represented by General Formula [1-5].

$$xLiM^5O_2 \cdot (1-x)Li_2M^6O_3 \quad [1\text{-}5]$$

In Formula [1-5], x represents a number that satisfies $0<x<1$, $M^5$ represents at least one metal element having an average oxidation number of $3^+$, and $M^5$ represents at least one metal element having a average oxidation number of $4^+$. In Formula [1-5], $M^5$ represents preferably a kind of metal element selected from trivalent Mn, Ni, Co, Fe, V, and Cr, but an average oxidation number may be trivalent with equal amounts of divalent and tetravalent metals.

In Formula [1-5], $M^6$ represents preferably one or more metal elements selected from Mn, Zr, and Ti. Nickel is always included in either $M^5$ or $M^6$. Specific examples include $0.5[LiNi_{0.5}Mn_{0.5}O_2] \cdot 0.5[Li_2MnO_3]$, $0.5[LiNi_{1/3}Co_{1/3}Mn_{1/3}O_2] \cdot 0.5[Li_2MnO_3]$, $0.5[LiNi_{0.375}Co_{0.25}Mn_{0.375}O_2] \cdot 0.5[Li_2MnO_3]$, $0.5[LiNi_{0.375}Co_{0.125}Fe_{0.125}Mn_{0.375}O_2] \cdot 0.5[Li_2MnO_3]$, $0.45[LiNi_{0.37}Co_{0.25}Mn_{0.375}O_2] \cdot 0.10[Li_2TiO_3] \cdot 0.45[Li_2MnO_3]$.

The positive electrode active material (C) represented by General Formula [1-5] is known to exhibit high capacity when charged at a high voltage of 4.4 V (based on Li) or higher (for example, U.S. Pat. No. 7,135,252B).

These positive electrode active materials can be prepared, for example, according to production methods described in JP2008-270201A, WO2013/118661, JP2013-030284A, and the like.

The positive electrode active material contains a component selected from the above (A) to (C) as a main component, and the content of nickel in the metal contained in the positive electrode active material is 30% by mass to 100% by mass, and examples of other contained components include, for example, transition element chalcogenides such as $FeS_2$, $TiS_2$, $TiO_2$, $V_2O_5$, $MoO_3$, $MoS_2$, conductive polymers such as polyacetylene, polyparaphenylene, polyaniline, and polypyrrole, activated carbon, radical-generating polymers, and carbon materials.

[Positive Electrode Current Collector]

The (b) positive electrode includes a positive electrode current collector. As the positive electrode current collector, for example, aluminum, stainless steel, nickel, titanium, or alloys thereof can be used.

[Positive Electrode Active Material Layer]

In the (b) positive electrode, for example, a positive electrode active material layer is formed on at least one surface of the positive electrode current collector. The positive electrode active material layer includes, for example, the positive electrode active material described above, a binder, and, if necessary, an electrically conductive agent.

Examples of the binder include polytetrafluoroethylene, polyvinylidene fluoride, tetrafluoroethylene-perfluoroalkyl vinyl ether copolymers, styrene-butadiene rubber (SBR), carboxymethylcellulose, methylcellulose, cellulose acetate phthalate, hydroxypropylmethylcellulose, and polyvinyl alcohol.

Examples of the electrically conductive agent that can be used include carbon materials such as acetylene black, ketjen black, furnace black, carbon fiber, graphite (granular graphite and flake graphite), and fluorinated graphite. For the positive electrode, it is preferable to use acetylene black or ketjen black with low crystallinity.

[(c) Negative Electrode]

The negative electrode material is not particularly limited, but in a case of a lithium battery and a lithium ion battery, lithium metal, alloys of lithium metal and other metals, intermetallic compounds, various carbon materials (artificial graphite, natural graphite, and the like), metal oxides, metal nitrides, tin (single substance), tin compounds, silicon (single substance), silicon compounds, activated carbon, conductive polymers, and the like are used.

The carbon material includes, for example, graphitizable carbon, non-graphitizable carbon (hard carbon) having a (002) plane spacing of 0.37 nm or more, and graphite having a (002) plane spacing of 0.34 nm or less. More specifically, there are thermally decomposable carbon, cokes, glassy carbon fibers, organic polymer compound baked bodies, activated carbon, carbon blacks, and the like. Among the above, the cokes include pitch coke, needle coke, petroleum coke, and the like. The organic polymer compound baked body is a carbonized product obtained by baking a phenol resin, a furan resin, or the like at an appropriate temperature. The carbon material is preferable because the carbon material has a very small change in crystal structure due to absorption and desorption of lithium, so that a high energy density can be obtained and excellent cycle characteristics can be obtained. A shape of the carbon material may be fibrous, spherical, granular or flake. Amorphous carbon or a graphite material coated with amorphous carbon on a surface is more preferable because reactivity between the surface of the material and an electrolytic solution is low.

The (c) negative electrode preferably contains at least one negative electrode active material.

[Negative Electrode Active Material]

In the case of the lithium ion secondary battery in which cations in the nonaqueous electrolytic solution are mainly lithium, the negative electrode active material constituting the (c) negative electrode is capable of doping and dedoping lithium ions, and includes those containing at least one selected from, for example, (E) a carbon material in which a d value of a lattice plane (002 plane) in X-ray diffraction is 0.340 nm or less, (F) a carbon material in which the d value of the lattice plane (002 plane) in X-ray diffraction exceeds 0.340 nm, (G) oxides of one or more metal selected from Si, Sn, and Al, (H) one or more metals selected from Si, Sn, and Al, alloys containing these metals, alloys of these metals and lithium, or alloys of the above alloys and lithium, and (I) lithium titanium oxide. One of these negative electrode active materials can be used alone, or two or more thereof can be used in combination.

((E) Carbon Material in which d Value of Lattice Plane (002 Plane) in X-Ray Diffraction is 0.340 nm or Less)

Regarding the (E) carbon material in which the d value of the lattice plane (002 plane) in X-ray diffraction is 0.340 nm or less, the (E) carbon material which is an example of the negative electrode active material includes, for example, pyrolytic carbons, cokes (for example, pitch coke, needle coke, and petroleum coke), graphite, organic polymer compound baked bodies (for example, carbonized products obtained by baking phenol resin, furan resin, and the like at an appropriate temperature), carbon fibers, and activated carbon, and these examples may be graphitized. The carbon material has a (002) plane spacing (d002) of 0.340 nm or less as measured by an X-ray diffraction method, and is preferably graphite having a true density of 1.70 $g/cm^3$ or more or a highly crystalline carbon material having properties close to that of graphite.

((F) Carbon Material in which d Value of Lattice Plane (002 Plane) in X-Ray Diffraction Exceeds 0.340 nm)

Regarding the (F) carbon material in which the d value of the lattice plane (002 plane) in X-ray diffraction exceeds 0.340 nm, the (F) carbon material which is an example of the negative electrode active material includes amorphous carbon, and the amorphous carbon is a carbon material whose stacking order hardly changes even when heat-treated at a high temperature of 2000° C. or higher. Examples include non-graphitizable carbon (hard carbon), mesocarbon microbeads (MCMB) baked at 1500° C. or less, and mesophase pitch carbon fiber (MCF). Carbotron (registered trademark) P or the like manufactured by Kureha Corporation is a typical example.

((G) Oxides of One or More Metal Selected from Si, Sn, and Al)

Examples of (G) oxides of one or more metal selected from Si, Sn, and Al, which are examples of the negative electrode active material, include silicon oxide and tin oxide, which can be doped and undoped with lithium ions.

$SiO_x$ and the like have a structure in which Si ultrafine particles are dispersed in $SiO_2$. When this material is used as the negative electrode active material, charging and discharging are performed smoothly because Si that reacts with Li is ultrafine particles, while the $SiO_x$ particles themselves having the above structure have a small surface area, and thus, the composition (paste) for forming the negative electrode active material layer has good coating properties and good adhesion of the negative electrode mixture layer to the current collector.

Since $SiO_x$ undergoes a large volume change during charging and discharging, it is possible to achieve both high capacity and good charging and discharging cycle characteristics by using $SiO_x$ and graphite of the negative electrode active material (E) in a specific ratio as the negative electrode active material.

((H) One or More Metals Selected from Si, Sn, and Al, Alloys Containing these Metals, Alloys of these Metals and Lithium, or Alloys of these Alloys and Lithium)

Regarding the (H) one or more metals selected from Si, Sn, and Al, alloys containing these metals, alloys of these metals and lithium, or alloys of the above alloys and lithium, examples of the (H) which is an example of the negative electrode active material include metals such as silicon, tin, and aluminum, silicon alloys, tin alloys, and aluminum alloys, and materials in which these metals and alloys are alloyed with lithium during charging and discharging can also be used.

Preferable specific examples include simple metals (for example, powdered ones) such as silicon (Si) and tin (Sn), metal alloys, compounds containing the metals, and alloys containing tin (Sn) and cobalt (Co) in these metals, which are described in WO2004/100293 and JP2008-016424A. When the metals are used for the electrode, the metals are preferable because high charging capacity can be exhibited and the expansion and contraction of the volume due to charging and discharging is relatively small. These metals are known to exhibit high charging capacity because the metals are alloyed with Li during charging when used for a negative electrode of a lithium ion secondary battery, and are also preferable in this respect.

Furthermore, for example, a negative electrode active material formed of silicon pillars with a submicron diameter, and a negative electrode active material made of fibers made of silicon, which are described in WO2004/042851, WO2007/083155, and the like may be used.

((I) Lithium Titanium Oxide)

Examples of the (I) lithium titanium oxide which is an example of the negative electrode active material include lithium titanate having a spinel structure, lithium titanate having a ramsdellite structure, and the like.

Examples of lithium titanate having the spinel structure include $Li_{4+\alpha}Ti_5O_{12}$ ($\alpha$ varies within a range of $0 \leq \alpha \leq 3$ depending on a charging and discharging reaction). Examples of lithium titanate having the ramsdellite structure include $Li_{2+\beta}Ti_3O_7$ ($\beta$ varies within a range of $0 \leq \beta \leq 3$ depending on the charging and discharging reaction). These negative electrode active materials can be prepared, for example, according to production methods described in JP2007-018883A, JP2009-176752A, and the like.

For example, in a case of a sodium ion secondary battery in which cations in a nonaqueous electrolytic solution are mainly sodium, hard carbon, oxides such as $TiO_2$, $V_2O_5$, and $MoO_3$ are used as the negative electrode active material. For example, in the case of the sodium ion secondary battery in which the cations in the nonaqueous electrolytic solution are mainly sodium, a positive electrode active material can use sodium-containing transition metal composite oxides such as $NaFeO_2$, $NaCrO_2$, $NaNiO_2$, $NaMnO_2$, and $NaCoO_2$, a mixture of a plurality of transition metals such as Fe, Cr, Ni, Mn, and Co and these sodium-containing transition metal composite oxides, those in which a part of the transition metals of these sodium-containing transition metal composite oxides are replaced with other metals other than the transition metals, transition metal phosphate compounds, such as $Na_2FeP_2O_7$ and $NaCo_3(PO_4)_2P_2O_7$, sulfides such as $TiS_2$ and $FeS_2$, or conductive polymers such as polyacetylene, polyparaphenylene, polyaniline, and polypyrrole, activated carbon, radical-generating polymers, carbon materials, and the like.

[Negative Electrode Current Collector]

The (c) negative electrode includes the negative electrode current collector. As the negative electrode current collector, for example, copper, stainless steel, nickel, titanium, alloys thereof, or the like can be used.

[Negative Electrode Active Material Layer]

In the (c) negative electrode, for example, a negative electrode active material layer is formed on at least one surface of the negative electrode current collector. The negative electrode active material layer includes, for example, the negative electrode active material described above, a binder, and, if necessary, an electrically conductive agent.

Examples of the binder include polytetrafluoroethylene, polyvinylidene fluoride, tetrafluoroethylene-perfluoroalkyl vinyl ether copolymers, styrene-butadiene rubber (SBR), carboxymethylcellulose, methylcellulose, cellulose acetate phthalate, hydroxypropylmethylcellulose, and polyvinyl alcohol.

Examples of the electrically conductive agent that can be used include carbon materials such as acetylene black, ketjen black, furnace black, carbon fiber, graphite (granular graphite and flake graphite), and fluorinated graphite.

[Method for Producing Electrodes ((b) Positive Electrode and (c) Negative Electrode)]

For example, an active material, a binder, and, if necessary, an electrically conductive agent are dispersed and kneaded in a solvent such as N-methyl-2-pyrrolidone (NMP) or water in a predetermined blending amount, the obtained paste is applied to a current collector and dried to form an active material layer, and electrodes can be obtained. The obtained electrodes are preferably compressed by a method such as roll pressing to adjust the electrodes to an appropriate density.

[(d) Separator]

The above nonaqueous electrolytic solution battery can be provided with the (d) separator. As a separator for preventing contact between the (b) positive electrode and the (c) negative electrode, a nonwoven fabric or porous sheet made of polyolefin such as polypropylene or polyethylene, cellulose, paper, glass fiber, or the like is used. The films are preferably microporous such that the electrolytic solution is easily permeated and the ions are easily permeated.

Examples of the polyolefin separator include a film such as a microporous polymer film such as a porous polyolefin film that electrically insulates the positive electrode and the negative electrode and is permeable to lithium ions. As a specific example of the porous polyolefin film, for example, a porous polyethylene film may be used alone, or the porous polyethylene film and a porous polypropylene film may be laminated to form a multilayer film. A film obtained by combining the porous polyethylene film and the polypropylene film can be used.

[Exterior Body]

In constructing the nonaqueous electrolytic solution battery, as an exterior body of the nonaqueous electrolytic solution battery, for example, a coin-shaped, cylindrical, square-shaped metal can, or a laminated exterior body can be used. Metal can materials include, for example, nickel-plated steel plates, stainless steel plates, nickel-plated stainless steel plates, aluminum or alloys thereof, nickel, and titanium.

As the laminated exterior body, for example, an aluminum laminated film, a SUS laminated film, a silica-coated polypropylene or polyethylene laminated film, or the like can be used.

The configuration of the nonaqueous electrolytic solution battery according to the present example is not particularly limited, and for example, can be a configuration in which the electrode element having the positive electrode and the negative electrode arranged to face each other and the nonaqueous electrolytic solution can be included in the exterior body. A shape of the nonaqueous electrolytic solution battery is not particularly limited, and an electrochemical device having a shape such as a coin shape, a cylindrical shape, a square shape, or an aluminum laminate sheet shape can be assembled based on the above elements.

EXAMPLES

The present disclosure will be described in more detail below with reference to Examples, but the present disclosure is not limited by these descriptions.

<Preparation of Electrolytic Solutions in Table 1>

In a nitrogen atmosphere dry box with a dew point of −50° C. or lower, while a liquid temperature was maintained at 30° C., $LiPF_6$ as (II) a solute was dissolved in the (I) nonaqueous solvent (volume ratio EC:EMC=1:2) of EC and EMC dissolved by heating to 30° C. in advance so as to be 1.0 mol/L with respect to 100% by mass of the total amount of (I) to (III), Compound (1-1) as (III) was dissolved such that a content was 0.005% by mass with respect to 100% by mass of the total amount of (I) to (III), so that electrolytic solution No. (1-1)-0.005-(0) was prepared. In addition, electrolytic solutions described in Table 1 were prepared in the same procedure as above except that the content of the (III) component was changed.

TABLE 1

| | (I) | (II) Solute | | (III) Compound of General Formula [1] | | Another additive | |
|---|---|---|---|---|---|---|---|
| Electrolytic solution No. | Nonaqueous solvent | Type | Content [mol/L] | Type | Content [% by mass] | Type | Content [% by mass] |
| (1-1)-0.005-(0) | EC:EMC = 1:2 (volume ratio) | $LiPF_6$ | 1.0 | (1-1) | 0.005 | None | — |
| (1-1)-0.01-(0) | | | | | 0.01 | | |
| (1-1)-0.05-(0) | | | | | 0.05 | | |
| (1-1)-0.1-(0) | | | | | 0.1 | | |
| (1-1)-0.5-(0) | | | | | 0.5 | | |
| (1-1)-1.0-(0) | | | | | 1.0 | | |
| (1-1)-1.5-(0) | | | | | 1.5 | | |
| (1-1)-2.0-(0) | | | | | 2.0 | | |
| (1-1)-5.0-(0) | | | | | 5.0 | | |
| (1-1)-10.0-(0) | | | | | 10.0 | | |
| (0)-(0) | | | | None | — | | |

Example 1-1

<Production of NCM622 Positive Electrode>

$LiNi_{6/10}Co_{2/10}Mn_{2/10}O_2$ (hereinafter, sometimes described as "NCM622") powder as the positive electrode active material is dry-mixed with acetylene black (electrically conductive agent), and was uniformly dispersed and mixed in N-methyl-2-pyrrolidone (hereinafter, sometimes described as "NMP") in which polyvinylidene fluoride (hereinafter, sometimes described as "PVDF") as a binder was dissolved in advance, and further. NMP for adjusting viscosity was added, and an NCM622 mixture paste was prepared. The paste was applied onto an aluminum foil (current collector), dried, and pressurized, and then the aluminum foil was processed into a predetermined size to obtain an NCM622 positive electrode. A ratio of solid contents in the positive electrode was NCM622:electrically conductive agent:PVDF=85:5:10 (by mass ratio).

<Production of Graphite Negative Electrode>

Graphite powder as the negative electrode active material was uniformly dispersed and mixed in NMP in which PVDF as a binder was previously dissolved, and then NMP for adjusting viscosity was added, and a graphite mixture paste was prepared. The paste was applied onto a copper foil (current collector), dried, and pressurized, and then the copper foil was processed into a predetermined size to obtain a graphite negative electrode. A ratio of solid contents in the negative electrode was graphite powder:PVDF=90:10 (by mass ratio).

<Production of Nonaqueous Electrolytic Solution Battery>

An aluminum laminate housing cell (capacity 30 mAh) including the above NCM622 positive electrode, graphite negative electrode, and cellulose separator was impregnated with the electrolytic solution No. (1-1)-0.005-(0) shown in Table 1, and a nonaqueous electrolytic solution battery according to Example 1-1 was obtained.

<Evaluation 1> Capacity Retention Rate after 500 Cycles at 60° C.

The produced nonaqueous electrolytic solution battery was used, and conditioning was performed at an environmental temperature of 25° C. under the following conditions. That is, as the initial charging and discharging, charging is performed at a constant current and a constant voltage at a 0.1 C rate (3 mA) up to a charging upper limit voltage of 4.3 V, and discharging is performed at a 0.2 C rate (6 mA) constant current to a discharging end voltage of 3.0 V, and then, charging is performed at a constant current and a constant voltage at a 0.2 C rate (6 mA) up to a charging upper limit voltage of 4.3 V, and then the discharging was performed at the 0.2 C rate (6 mA) constant current until the discharging end voltage was 3.0 V, which is referred to as a charging and discharging cycle, and the charging and discharging cycle was repeated three times. The capacity obtained in this case was defined as an initial discharging capacity (25° C.).

After this conditioning, a charging and discharging test was performed at an environmental temperature of 60° C. The charging and discharging cycle was repeated 500 times, in which the charging is performed at a constant current and a constant voltage at a 3 C rate (90 mA) up to the charging upper limit voltage of 4.3 V, and the discharging was performed at a constant current of 3 C rate (90 mA) to the discharging end voltage of 3.0 V Subsequently, the nonaqueous electrolytic solution battery was cooled to 25° C. and discharged to 3.0 V again, and then was subjected to constant current and constant voltage charging to 4.3 V at 25° C. and 0.2 C rate (6 mA). Furthermore, while maintaining the temperature at 25° C., the discharging was performed at a constant current at the 0.2 C rate (6 mA) to the discharging end voltage of 3.0 V, and the capacity obtained in this case was taken as a discharging capacity after cycle at 60° C.

Then, the initial discharging capacity (25° C.) obtained as described above and the discharging capacity after cycle at 60° C. were used to obtain a capacity retention rate after 500 cycles at 60° C. from the following formula.

The capacity retention rate after 500 cycles at 60° C.=discharging capacity after cycle at 60° C.×100/initial discharging capacity (25° C.).

<Evaluation 2> 5 C Rate Characteristics after 500 Cycles at 60° C. (Output Characteristics after Cycle)

After carrying out the above Evaluation 1, the battery was discharged to 3.0 V again at 25° C., and then charged to 4.3 V at a 5 C rate (150 mA) at 25° C. with constant current and constant voltage. Furthermore, while maintaining the temperature at 25° C., the battery was discharged at a constant current at the 5 C rate (150 mA) to the discharging end voltage of 3.0 V, and the capacity obtained in this case was taken as 5 C rate characteristics (25° C.) after 500 cycles at 60° C. In the present evaluation, the nonaqueous electrolytic solution battery was fixed in consideration of safety and other factors.

<Evaluation 3> Measurement of Internal Resistance Value of Nonaqueous Electrolytic Solution Battery after 500 Cycles at 60° C.

After carrying out the above Evaluation 2, the battery was discharged to 3.0 V again at 25° C., and then charged to 4.3 V at the 0.2 C rate (6 mA) at 25° C. with constant current and constant voltage. Then, the nonaqueous electrolytic solution battery was connected to a circuit, and an internal resistance was measured at 25° C.

<Evaluation 4> Deposition Amount of Cu on Surface of Negative Electrode after Conditioning The produced nonaqueous electrolytic solution battery was used, and the same conditioning as in <Evaluation 1> was performed.

The cell after conditioning was disassembled in an argon atmosphere dry box with the dew point of −50° C. or less, the negative electrode was washed with diethyl carbonate, and then the negative electrode was dried, and X-ray photoelectron spectroscopy (XPS) measurement was performed on the coating on the surface of the negative electrode. Measured elements are F (1s), C (1s), O (1s), P (2p), S (2p), Li (1s) and Cu (2p), and percentages were obtained based on the total of 100 of the measured elements contained in coating components.

As described above, the percentage of Cu (2p) in the coating components was determined for each of Examples and Comparative Examples. A Cu (2p) percentage value of Comparative Examples described later (Comparative Examples using electrolytic solution No. (1-1)-10.0-(0), electrolytic solution No. (1-1)-10.0-(2-7)-1.0, electrolytic solution No. (1-1)-10.0-(DFBOP)-1.0, electrolytic solution No. (1-1)-10.0-(TFOP)-1.0, electrolytic solution No. (1-1)-10.0-(DFOB)-1.0, and electrolytic solution No. (1-1)-10.0-(2-2)-1.0) in which the content of Compound (1-1) is 10% by mass or a Cu (2p) percentage value of Comparative Examples described later (Comparative Examples using electrolytic solution No. (1-21)-10.0-(0) and electrolytic solution No. (1-21)-10.0-(DFBOP)-1.0) in which a content of Compound (1-21) is 10% by mass is 100, and the Cu (2p) percentage values of other corresponding Examples and Comparative Examples were calculated as relative values. The relative value was set as "deposition amount of Cu".

Evaluation results are shown in Table 2 and FIG. 1.

<Evaluations 1 to 3> of nonaqueous electrolytic solution batteries according to Example 1-1, Examples 1-2 to 1-7 described later, and Comparative Examples 1-1 to 1-4 were relative values when the evaluation results of Comparative Examples 1-4 were set to 100.

<Evaluation 4> of the nonaqueous electrolytic solution batteries according to Example 1-1, Examples 1-2 to 1-7 described later, and Comparative Examples 1-1 to 1-4 was relative value when an evaluation result of Comparative Example 1-3 was set to 100.

TABLE 2

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 1-1 | (1-1)-0.005-(0) | NCM622 | Graphite | 1.71 | 100 | 104 | 96 |
| Example 1-2 | (1-1)-0.01-(0) | | | 1.74 | 100 | 116 | 91 |
| Example 1-3 | (1-1)-0.05-(0) | | | 1.98 | 101 | 124 | 78 |
| Example 1-4 | (1-1)-0.1-(0) | | | 2.31 | 102 | 138 | 67 |
| Example 1-5 | (1-1)-0.5-(0) | | | 3.92 | 105 | 151 | 64 |
| Example 1-6 | (1-1)-1.0-(0) | | | 4.95 | 101 | 137 | 65 |
| Example 1-7 | (1-1)-1.5-(0) | | | 16.8 | 99 | 128 | 68 |
| Comparative Example 1-1 | (1-1)-2.0-(0) | | | 33.3 | 94 | 119 | 83 |
| Comparative Example 1-2 | (1-1)-5.0-(0) | | | 68.9 | 91 | 108 | 91 |
| Comparative Example 1-3 | (1-1)-10.0-(0) | | | 100 | 87 | 97 | 101 |
| Comparative Example 1-4 | (0)-(0) | | | 1.70 | 100 | 100 | 100 |

(*) Relative value when deposition amount of Cu in Comparative Example 1-3 was set to 100.
(**) Relative value when value of Comparative Example 1-4 was set to 100.

content of Compound (1-1) is 0.001% by mass or more, the effect of improving the output characteristics after the cycle is exerted (for example, comparison between Examples 1-1 to 1-7 and Comparative Example 1-4).

From the above, even when the nonaqueous electrolytic solution according to the present disclosure is applied to the positive electrode in which the content of nickel in the metal contained in the positive electrode active material is 30% by mass to 100% by mass, the effect of improving the output characteristics after cycle and the effect of reducing the

[Examples 1-2 to 1-7] [Comparative Examples 1-1 to 1-4]

Nonaqueous electrolytic solution batteries were produced in the same manner as in Example 1-1, except that the electrolytic solutions listed in Electrolytic solution No. in Table 2 were used instead of the electrolytic solution No. (1-1)-0.005-(0), and the same evaluations were performed. Evaluation results are shown in Table 2 and FIG. 1.

FIG. 1 is a plot of a deposition amount of the negative electrode current collector metal (Cu) on the surface of the negative electrode with respect to the content (% by mass) of Compound (1-1) which is the (III) component with respect to 100% by mass of the total amount of (I) to (III). From FIG. 1, it can be determined that when the content of Compound (1-1) exceeds 1.8% by mass, the deposition amount of Cu increases sharply. Conversely, when the content of Compound (1-1) is 1.8% by mass or less, the deposition amount of Cu can be reduced.

From the evaluation results of the output characteristics after the cycles in Table 2, it can be determined that when the deposition amount of the negative electrode current collector metal on the surface of the negative electrode after the initial charging and discharging can be exerted in a well-balanced manner. The nonaqueous electrolytic solution battery including the nonaqueous electrolytic solution, the negative electrode, and the positive electrode having the content of nickel of 30% by mass to 100% by mass in the metal contained in the positive electrode active material can exert, in a well-balanced manner, the effect of improving the output characteristics after cycle and the effect of reducing the deposition amount of the negative electrode current collector metal on the surface of the negative electrode after the initial charging and discharging.

<Preparation of Electrolytic Solutions in Table 3>

Electrolytic solutions described in Table 3 were prepared in the same procedure as in the preparation of the electrolytic solutions shown in Table 1 except that vinylene carbonate (hereinafter, sometimes described as "VC") as the other additive was further dissolved so as to be 1.0% by mass with respect to the total amount of the electrolytic solution.

TABLE 3

| | (I) | (II) Solute | | (III) Compound of General Formula [1] | | Another additive | |
|---|---|---|---|---|---|---|---|
| Electrolytic solution No. | Nonaqueous solvent | Type | Content [mol/L] | Type | Content [% by mass] | Type | Content [% by mass] |
| (1-1)-0.005-(2-7)-1.0 | EC:EMC = 1:2 (volume ratio) | $LiPF_6$ | 1.0 | (1-1) | 0.005 | VC | 1.0 |
| (1-1)-0.01-(2-7)-1.0 | | | | | 0.01 | | |
| (1-1)-0.05-(2-7)-1.0 | | | | | 0.05 | | |

TABLE 3-continued

| Electrolytic solution No. | (I) Nonaqueous solvent | (II) Solute Type | (II) Solute Content [mol/L] | (III) Compound of General Formula [1] Type | (III) Compound of General Formula [1] Content [% by mass] | Another additive Type | Another additive Content [% by mass] |
|---|---|---|---|---|---|---|---|
| (1-1)-0.1-(2-7)-1.0 | | | | | 0.1 | | |
| (1-1)-0.5-(2-7)-1.0 | | | | | 0.5 | | |
| (1-1)-1.0-(2-7)-1.0 | | | | | 1.0 | | |
| (1-1)-1.5-(2-7)-1.0 | | | | | 1.5 | | |
| (1-1)-2.0-(2-7)-1.0 | | | | | 2.0 | | |
| (1-1)-5.0-(2-7)-1.0 | | | | | 5.0 | | |
| (1-1)-10.0-(2-7)-1.0 | | | | | 10.0 | | |
| (0)-(2-7)-1.0 | | | | None | — | | |

[Examples 2-1 to 2-7] [Comparative Examples 2-1 to 2-4]

Figure 2:
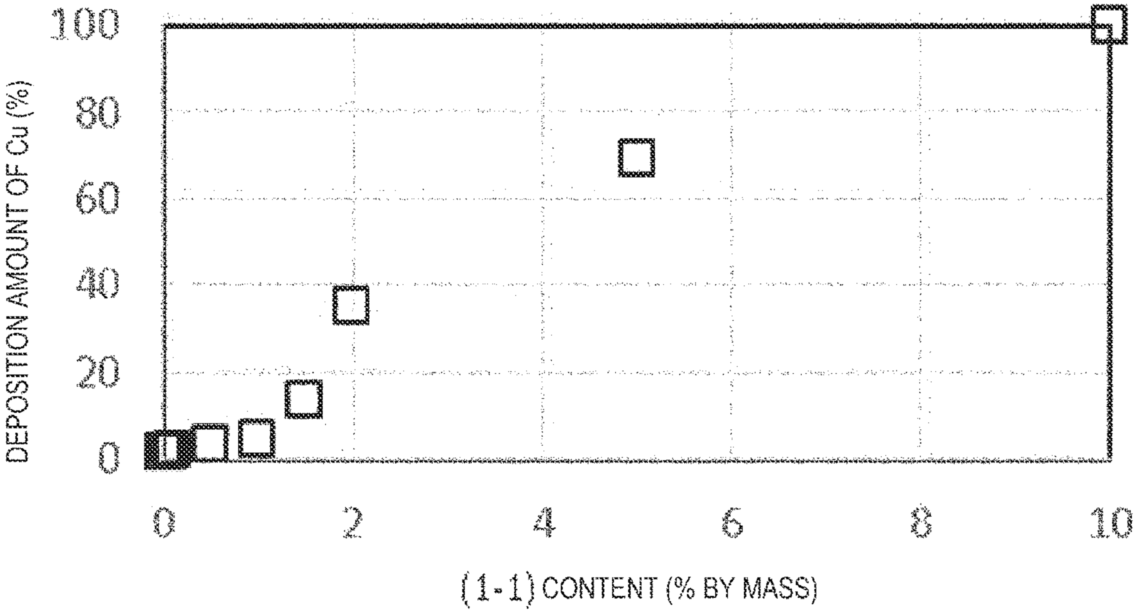
FIG. 2 shows a deposition amount of the negative electrode current collector metal (Cu) on the surface of the negative electrode with respect to the content of Compound (1-1) as the (III) component (Examples 2-1 to 2-7 and Comparative Examples 2-1 to 2-4).

A nonaqueous electrolytic solution battery was produced in the same manner as in Example 1-1, except that electrolytic solutions listed in Electrolytic solution No. in Table 4 were used instead of the electrolytic solution No. (1-1)-0.005-(0), and the same evaluations were performed. Evaluation results are shown in Table 4 and FIG. 2.

From the above results, in the composition containing other additives (VC), even when the nonaqueous electrolytic solution according to the present disclosure is applied to the positive electrode having the content of nickel of 30% by mass to 100% by mass in the metal contained in the positive electrode active material, the effect of improving the output characteristics after cycle and the effect of reducing the deposition amount of the negative electrode current collector metal on the surface of the negative electrode after the initial charging and discharging can also be exerted in a well-balanced manner. The nonaqueous electrolytic solution battery including the nonaqueous electrolytic solution, the negative electrode, and the positive electrode having the content of nickel of 30% by mass to 100% by mass in the metal contained in the positive electrode active material can exert, in a well-balanced manner, the effect of improving the output characteristics after cycle and the effect of reducing the deposition amount of the negative electrode current collector metal on the surface of the negative electrode after the initial charging and discharging.

[Examples 3-1 to 3-7] [Comparative Examples 3-1 to 3-4]

Figure 3:
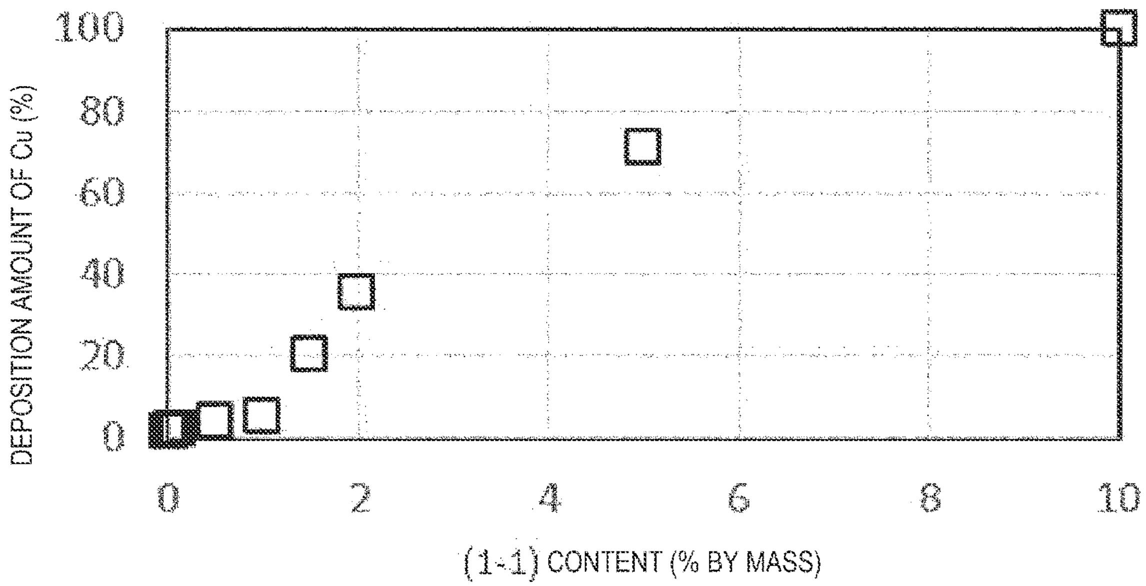
FIG. 3 shows a deposition amount of the negative electrode current collector metal (Cu) on the surface of the negative electrode with respect to the content of Compound (1-1) as the (III) component (Examples 3-1 to 3-7 and Comparative Examples 3-1 to 3-4).

As shown in Table 5, nonaqueous electrolytic solution batteries were produced in the same manner as in Examples 1-1 to 1-7 and Comparative Examples 1-1 to 1-4, except for using an NCA positive electrode described later as the positive electrode, and the same evaluations were performed. Evaluation results are shown in Table 5 and FIG. 3.

<Production of NCA Positive Electrode>

$LiNi_{0.85}Co_{0.10}Al_{0.05}O_2$ (hereinafter, sometimes described as "NCA") powder (manufactured by Toda Kogyo Corporation) as the positive electrode active material is dry-mixed with acetylene black (electrically conductive agent), and was uniformly dispersed and mixed in NMP in which PVDF as a binder was dissolved in advance, and further, NMP for adjusting viscosity was added, and an NCA mixture paste was prepared. The paste was applied onto an aluminum foil (current collector), dried, and pressurized, and then the aluminum foil was processed into a predetermined size to obtain an NCA positive electrode. A ratio of solid contents in the positive electrode was NCA:electrically conductive agent:PVDF=85:5:10 (by mass ratio).

TABLE 4

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 2-1 | (1-1)-0.005-(2-7)-1.0 | NCM622 | Graphite | 1.70 | 100 | 102 | 98 |
| Example 2-2 | (1-1)-0.01-(2-7)-1.0 | | | 1.73 | 100 | 112 | 87 |
| Example 2-3 | (1-1)-0.05-(2-7)-1.0 | | | 1.89 | 101 | 121 | 81 |
| Example 2-4 | (1-1)-0.1-(2-7)-1.0 | | | 2.18 | 101 | 126 | 76 |
| Example 2-5 | (1-1)-0.5-(2-7)-1.0 | | | 3.67 | 102 | 135 | 68 |
| Example 2-6 | (1-1)-1.0-(2-7)-1.0 | | | 4.71 | 101 | 127 | 74 |
| Example 2-7 | (1-1)-1.5-(2-7)-1.0 | | | 13.9 | 100 | 123 | 76 |
| Comparative Example 2-1 | (1-1)-2.0-(2-7)-1.0 | | | 34.9 | 100 | 120 | 80 |
| Comparative Example 2-2 | (1-1)-5.0-(2-7)-1.0 | | | 69.2 | 94 | 111 | 87 |
| Comparative Example 2-3 | (1-1)-10.0-(2-7)-1.0 | | | 100 | 88 | 104 | 98 |
| Comparative Example 2-4 | (0)-(2-7)-1.0 | | | 1.69 | 100 | 100 | 100 |

(*) Relative value when deposition amount of Cu in Comparative Example 2-3 was set to 100.

(**) Relative value when value of Comparative Example 2-4 was set to 100.

TABLE 5

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 3-1 | (1-1)-0.005-(0) | NCA | Graphite | 1.73 | 100 | 104 | 95 |
| Example 3-2 | (1-1)-0.01-(0) | | | 1.77 | 101 | 115 | 91 |
| Example 3-3 | (1-1)-0.05-(0) | | | 2.01 | 104 | 125 | 77 |
| Example 3-4 | (1-1)-0.1-(0) | | | 2.49 | 107 | 140 | 65 |
| Example 3-5 | (1-1)-0.5-(0) | | | 4.02 | 108 | 154 | 64 |
| Example 3-6 | (1-1)-1.0-(0) | | | 5.01 | 106 | 134 | 66 |
| Example 3-7 | (1-1)-1.5-(0) | | | 20.1 | 104 | 127 | 69 |
| Comparative Example 3-1 | (1-1)-2.0-(0) | | | 35.2 | 99 | 121 | 75 |
| Comparative Example 3-2 | (1-1)-5.0-(0) | | | 71.1 | 93 | 112 | 90 |
| Comparative Example 3-3 | (1-1)-10.0-(0) | | | 100 | 87 | 103 | 99 |
| Comparative Example 3-4 | (0)-(0) | | | 1.72 | 100 | 100 | 100 |

(*) Relative value when deposition amount of Cu in Comparative Example 3-3 was set to 100.
(**) Relative value when value of Comparative Example 3-4 was set to 100.

[Examples 4-1 to 4-7] [Comparative Examples 4-1 to 4-4]

Figure 4:
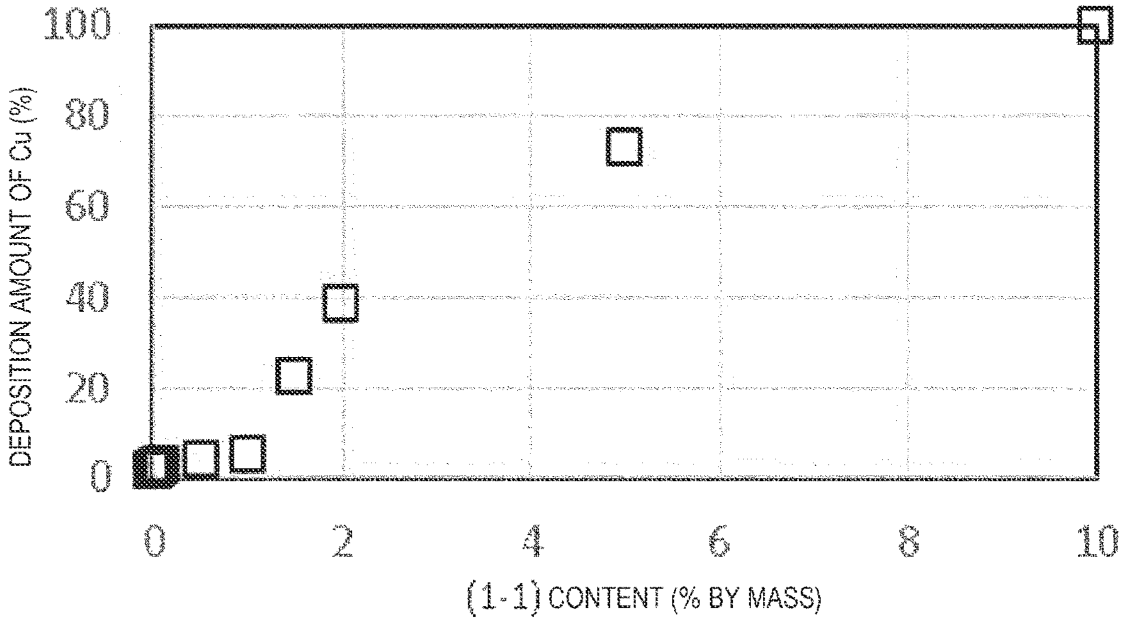
FIG. 4 shows a deposition amount of the negative electrode current collector metal (Cu) on the surface of the negative electrode with respect to the content of Compound (1-1) as the (III) component (Examples 4-1 to 4-7 and Comparative Examples 4-1 to 4-4).

As shown in Table 6, nonaqueous electrolytic solution batteries were produced in the same manner as in Examples 2-1 to 2-7 and Comparative Examples 2-1 to 2-4, except for using the NCA positive electrode as the positive electrode, and the same evaluations were performed. Evaluation results are shown in Table 6 and FIG. 4.

<Production of $SiO_x$ Negative Electrode>

A powder mixture of a silicon oxide powder disproportioned by heat treatment ($SiO_x$ (x is 0.3 to 1.6, mean particle size: 5 μm) manufactured by Sigma Aldrich Japan, Co. LLC.) as a silicon oxide powder and MAG-D (particle size: 20 μm or less) manufactured by Hitachi Chemical Co., Ltd. as an aggregated artificial graphite powder was uniformly dispersed and mixed into NMP in which PVDF as a binder was pre-dissolved, and Ketjen black (electrically conductive

TABLE 6

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 4-1 | (1-1)-0.005-(2-7)-1.0 | NCA | Graphite | 1.74 | 100 | 101 | 98 |
| Example 4-2 | (1-1)-0.01-(2-7)-1.0 | | | 1.79 | 101 | 107 | 89 |
| Example 4-3 | (1-1)-0.05-(2-7)-1.0 | | | 2.12 | 101 | 118 | 85 |
| Example 4-4 | (1-1)-0.1-(2-7)-1.0 | | | 2.53 | 102 | 124 | 79 |
| Example 4-5 | (1-1)-0.5-(2-7)-1.0 | | | 4.03 | 103 | 131 | 71 |
| Example 4-6 | (1-1)-1.0-(2-7)-1.0 | | | 5.12 | 102 | 123 | 77 |
| Example 4-7 | (1-1)-1.5-(2-7)-1.0 | | | 22.3 | 101 | 118 | 80 |
| Comparative Example 4-1 | (1-1)-2.0-(2-7)-1.0 | | | 38.3 | 101 | 116 | 84 |
| Comparative Example 4-2 | (1-1)-5.0-(2-7)-1.0 | | | 72.9 | 97 | 112 | 89 |
| Comparative Example 4-3 | (1-1)-10.0-(2-7)-1.0 | | | 100 | 89 | 102 | 99 |
| Comparative Example 4-4 | (0)-(2-7)-1.0 | | | 1.72 | 100 | 100 | 100 |

(*) Relative value when deposition amount of Cu in Comparative Example 4-3 was set to 100.
(**) Relative value when value of Comparative Example 4-4 was set to 100.

[Examples 5-1 to 5-7] [Comparative Examples 5-1 to 5-4]

Figure 5:
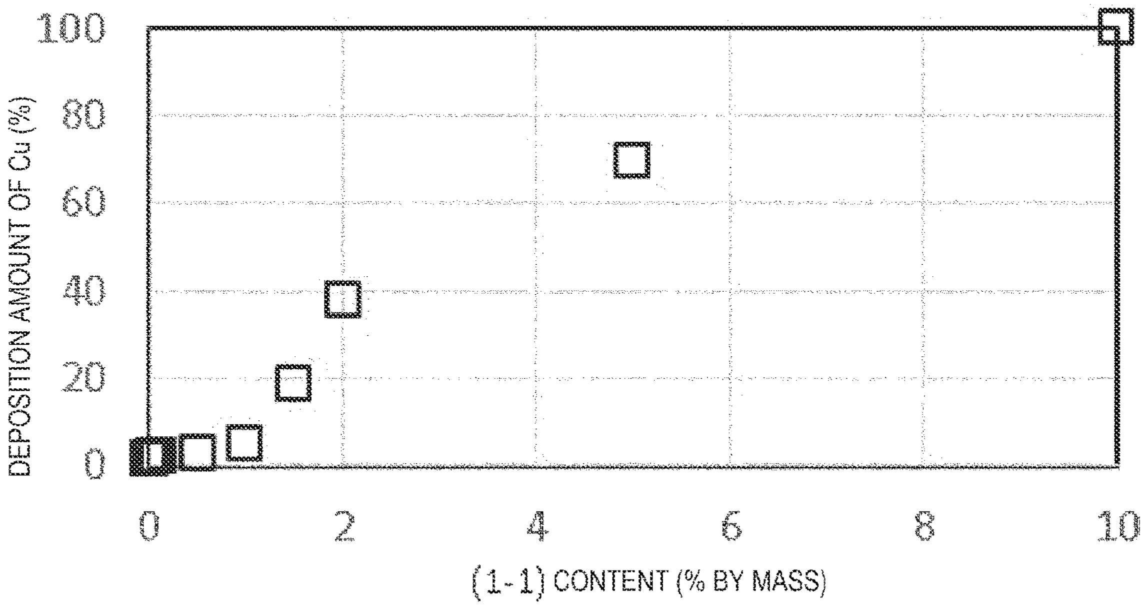
FIG. 5 shows a deposition amount of a negative electrode current collector metal (Cu) on the surface of the negative electrode with respect to the content of Compound (1-1) as the (III) component (Examples 5-1 to 5-7 and Comparative Examples 5-1 to 5-4).

As shown in Table 7, nonaqueous electrolytic solution batteries were produced in the same manner as in Examples 1-1 to 1-7 and Comparative Examples 1-1 to 1-4, except for using an $SiO_x$ negative electrode described later as the negative electrode, and the same evaluations were performed. Evaluation results are shown in Table 7 and FIG. 5.

agent) was further added and mixed, and NMP for adjusting the viscosity was then further added to prepare an $SiO_x$ mixture paste. The paste was applied onto a copper foil (current collector), dried, and pressurized, and then the copper foil was processed into a predetermined size to obtain a $SiO_x$ negative electrode. A ratio of solid contents in the negative electrode was SiOx:MAG-D:electrically conductive agent:PVDF=35:47:8:10 (by mass ratio).

It is noted that the amounts of an NMC622 positive electrode active material and the $SiO_x$ powder were adjusted such that a charging capacity of the $SiO_x$ negative electrode is larger than a charging capacity of the NMC622 positive electrode, and the applied amount was also adjusted such that a lithium metal does not deposit on the $SiO_x$ negative electrode during charging.

TABLE 7

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 5-1 | (1-1)-0.005-(0) | NCM622 | SiOx | 1.72 | 100 | 103 | 96 |
| Example 5-2 | (1-1)-0.01-(0) | | | 1.77 | 101 | 113 | 92 |
| Example 5-3 | (1-1)-0.05-(0) | | | 1.98 | 101 | 121 | 79 |
| Example 5-4 | (1-1)-0.1-(0) | | | 2.12 | 103 | 130 | 68 |
| Example 5-5 | (1-1)-0.5-(0) | | | 2.49 | 104 | 137 | 64 |
| Example 5-6 | (1-1)-1.0-(0) | | | 4.97 | 102 | 129 | 69 |
| Example 5-7 | (1-1)-1.5-(0) | | | 18.8 | 100 | 123 | 72 |
| Comparative Example 5-1 | (1-1)-2.0-(0) | | | 37.9 | 98 | 119 | 78 |
| Comparative Example 5-2 | (1-1)-5.0-(0) | | | 69.8 | 94 | 109 | 88 |
| Comparative Example 5-3 | (1-1)-10.0-(0) | | | 100 | 87 | 101 | 97 |
| Comparative Example 5-4 | (0)-(0) | | | 1.71 | 100 | 100 | 100 |

(*) Relative value when deposition amount of Cu in Comparative Example 5-3 was set to 100.
(**) Relative value when value of Comparative Example 5-4 was set to 100.

[Examples 6-1 to 6-7] [Comparative Examples 6-1 to 6-4]

Figure 6:
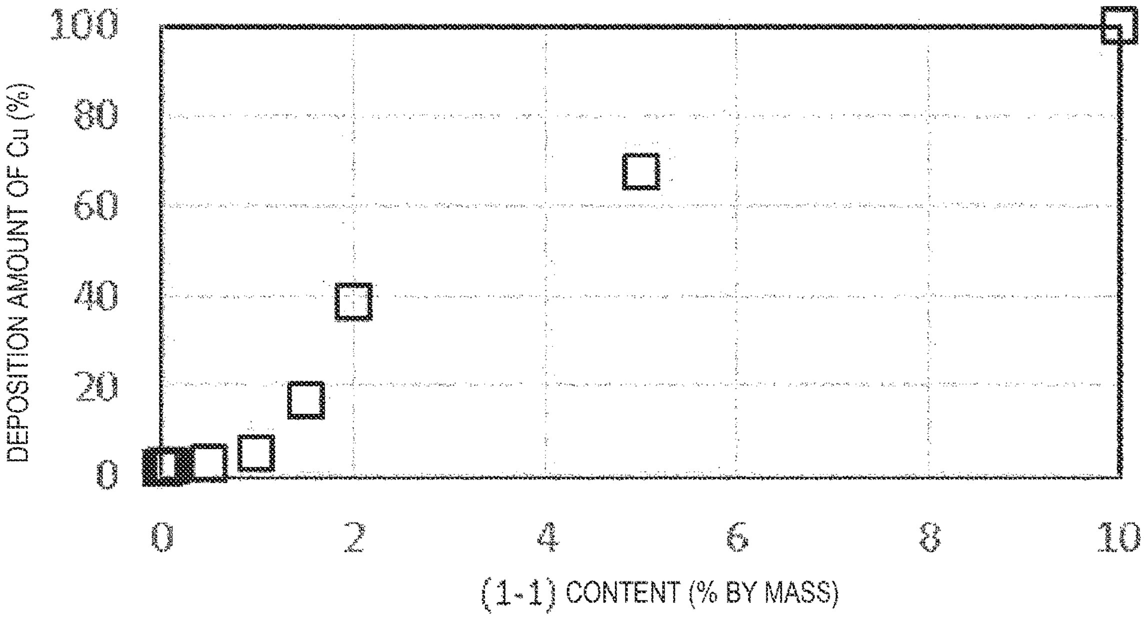
FIG. 6 shows a deposition amount of the negative electrode current collector metal (Cu) on the surface of the negative electrode with respect to the content of Compound (1-1) as the (III) component (Examples 6-1 to 6-7 and Comparative Examples 6-1 to 6-4).

As shown in Table 8, nonaqueous electrolytic solution batteries were produced in the same manner as in Examples 2-1 to 2-7 and Comparative Examples 2-1 to 2-4, except for using the $SiO_x$ negative electrode as the negative electrode, and the same evaluations were performed. Evaluation results are shown in Table 8 and FIG. 6.

It is noted that when producing the battery, the amounts of the NMC622 positive electrode active material and the $SiO_x$ powder were adjusted such that the charging capacity of the $SiO_x$ negative electrode is larger than the charging capacity of the NMC622 positive electrode, and the applied amount was also adjusted such that a lithium metal does not deposit on the $SiO_x$ negative electrode during charging.

TABLE 8

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 6-1 | (1-1)-0.005-(2-7)-1.0 | NCM622 | SiOx | 1.71 | 100 | 101 | 99 |
| Example 6-2 | (1-1)-0.01-(2-7)-1.0 | | | 1.74 | 100 | 106 | 95 |
| Example 6-3 | (1-1)-0.05-(2-7)-1.0 | | | 1.95 | 101 | 117 | 89 |
| Example 6-4 | (1-1)-0.1-(2-7)-1.0 | | | 2.20 | 102 | 121 | 83 |
| Example 6-5 | (1-1)-0.5-(2-7)-1.0 | | | 2.52 | 103 | 129 | 80 |
| Example 6-6 | (1-1)-1.0-(2-7)-1.0 | | | 4.96 | 101 | 122 | 82 |
| Example 6-7 | (1-1)-1.5-2-7)-1.0 | | | 16.5 | 101 | 117 | 85 |
| Comparative Example 6-1 | (1-1)-2.0-(2-7)-1.0 | | | 38.1 | 101 | 114 | 87 |
| Comparative Example 6-2 | (1-1)-5.0-(2-7)-1.0 | | | 67.5 | 97 | 108 | 91 |

TABLE 8-continued

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Comparative Example 6-3 | (1-1)-10.0-(2-7)-1.0 | | | 100 | 91 | 102 | 98 |
| Comparative Example 6-4 | (0)-(2-7)-1.0 | | | 1.70 | 100 | 100 | 100 |

(*) Relative value when deposition amount of Cu in Comparative Example 6-3 was set to 100.
(**) Relative value when value of Comparative Example 6-4 was set to 100.

[Examples 7-1 to 7-7] [Comparative Examples 7-1 to 7-4]

Figure 7:
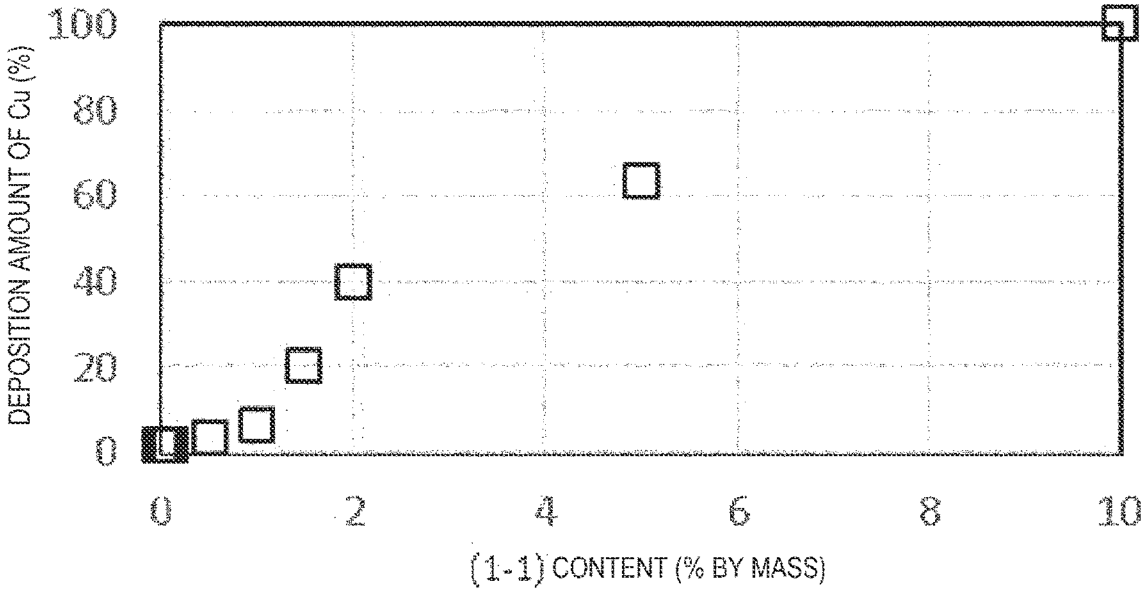
FIG. 7 shows a deposition amount of a negative electrode current collector metal (Cu) on the surface of the negative electrode with respect to the content of Compound (1-1) as the (III) component (Examples 7-1 to 7-7 and Comparative Examples 7-1 to 7-4).

As shown in Table 9, nonaqueous electrolytic solution batteries were produced in the same manner as in Examples 1-1 to 1-7 and Comparative Examples 1-1 to 1-4, except for using an NCM111 positive electrode described later as the positive electrode, and the same evaluations were performed. Evaluation results are shown in Table 9 and FIG. 7.

<Production of NCM111 Positive Electrode>

$LiNi_{1/3}Co_{1/3}Mn_{1/3}O_2$ (hereinafter, sometimes described as "NCM111") powder as the positive electrode active material is dry-mixed with acetylene black (electrically conductive agent), and was uniformly dispersed and mixed in NMP in which PVDF as a binder was dissolved in advance, and further, NMP for adjusting viscosity was added to prepare an NCM111 mixture paste. The paste was applied onto an aluminum foil (current collector), dried, and pressurized, and then the aluminum foil was processed into a predetermined size to obtain an NCM111 positive electrode. A ratio of solid contents in the positive electrode was NCM111:electrically conductive agent:PVDF=85:5:10 (by mass ratio).

TABLE 9

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 7-1 | (1-1)-0.005-(0) | NCM111 | Graphite | 1.64 | 100 | 103 | 97 |
| Example 7-2 | (1-1)-0.01-(0) | | | 1.65 | 100 | 109 | 93 |
| Example 7-3 | (1-1)-0.05-(0) | | | 1.69 | 101 | 116 | 85 |
| Example 7-4 | (1-1)-0.1-(0) | | | 1.72 | 103 | 128 | 79 |
| Example 7-5 | (1-1)-0.5-(0) | | | 3.01 | 106 | 141 | 64 |
| Example 7-6 | (1-1)-1.0-(0) | | | 5.89 | 105 | 134 | 73 |
| Example 7-7 | (1-1)-1.5-(0) | | | 19.8 | 103 | 127 | 81 |
| Comparative Example 7-1 | (1-1)-2.0-(0) | | | 39.4 | 97 | 120 | 84 |
| Comparative Example 7-2 | (1-1)-5.0-(0) | | | 63.5 | 94 | 111 | 92 |
| Comparative Example 7-3 | (1-1)-10.0-(0) | | | 100 | 89 | 102 | 100 |
| Comparative Example 7-4 | (0)-(0) | | | 1.64 | 100 | 100 | 100 |

(*) Relative value when deposition amount of Cu in Comparative Example 7-3 was set to 100.
(**) Relative value when value of Comparative Example 7-4 was set to 100.

[Examples 8-1 to 8-7] [Comparative Examples 8-1 to 8-4]

Figure 8:
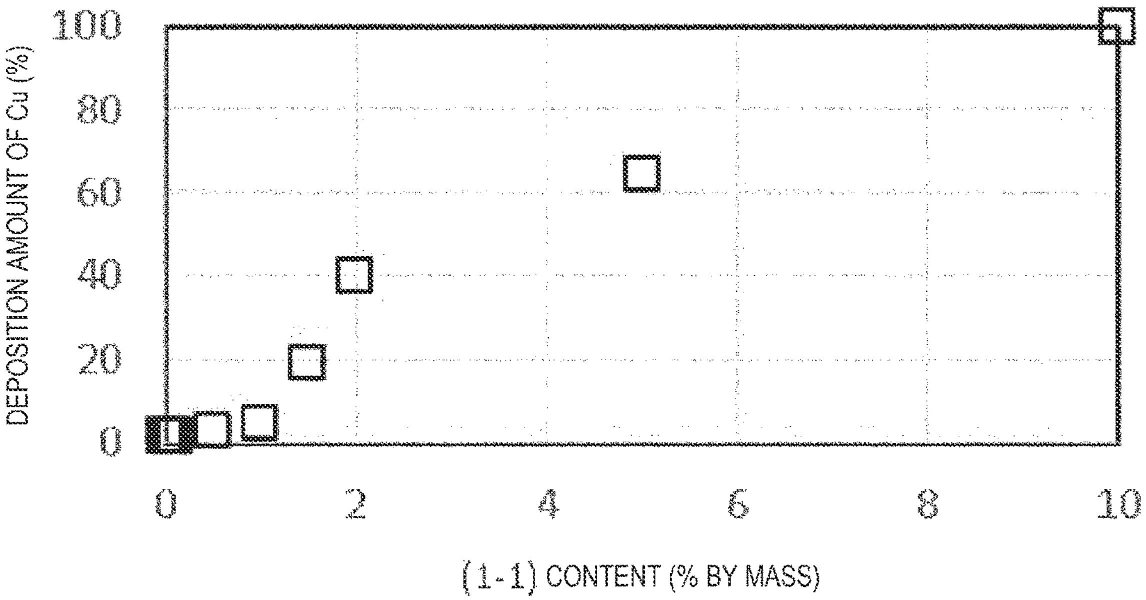
FIG. 8 shows a deposition amount of a negative electrode current collector metal (Cu) on the surface of the negative electrode with respect to the content of Compound (1-1) as the (III) component (Examples 8-1 to 8-7 and Comparative Examples 8-1 to 8-4).

As shown in Table 10, nonaqueous electrolytic solution batteries were produced in the same manner as in Examples 2-1 to 2-7 and Comparative Examples 2-1 to 2-4, except for using the NCM111 positive electrode as the positive electrode, and the same evaluations were performed. Evaluation results are shown in Table 10 and FIG. 8.

TABLE 10

| | Electrolytic solution No. | Positive electrode active material | Negative electrode active material | Deposition the amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 8-1 | (1-1)-0.005-(2-7)-1.0 | NCM111 | Graphite | 1.62 | 100 | 101 | 99 |
| Example 8-2 | (1-1)-0.01-(2-7)-1.0 | | | 1.63 | 100 | 105 | 96 |
| Example 8-3 | (1-1)-0.05-(2-7)-1.0 | | | 1.64 | 101 | 112 | 89 |
| Example 8-4 | (1-1)-0.1-(2-7)-1.0 | | | 1.69 | 102 | 119 | 84 |
| Example 8-5 | (1-1)-0.5-(2-7)-1.0 | | | 2.73 | 104 | 131 | 75 |
| Example 8-6 | (1-1)-1.0-(2-7)-1.0 | | | 4.59 | 103 | 126 | 79 |
| Example 8-7 | (1-1)-1.5-(2-7)-1.0 | | | 19.2 | 103 | 122 | 82 |
| Comparative Example 8-1 | (1-1)-2.0-(2-7)-1.0 | | | 40.1 | 101 | 114 | 87 |
| Comparative Example 8-2 | (1-1)-5.0-(2-7)-1.0 | | | 64.4 | 99 | 108 | 92 |
| Comparative Example 8-3 | (1-1)-10.0-(2-7)-1.0 | | | 100 | 95 | 98 | 103 |
| Comparative Example 8-4 | (0)-(2-7)-1.0 | | | 1.62 | 100 | 100 | 100 |

(*) Relative value when deposition amount of Cu in Comparative Example 8-3 was set to 100.
(**) Relative value when value of Comparative Example 8-4 was set to 100.

[Examples 9-1 to 9-7] [Comparative Examples 9-1 to 9-4]

Figure 9:
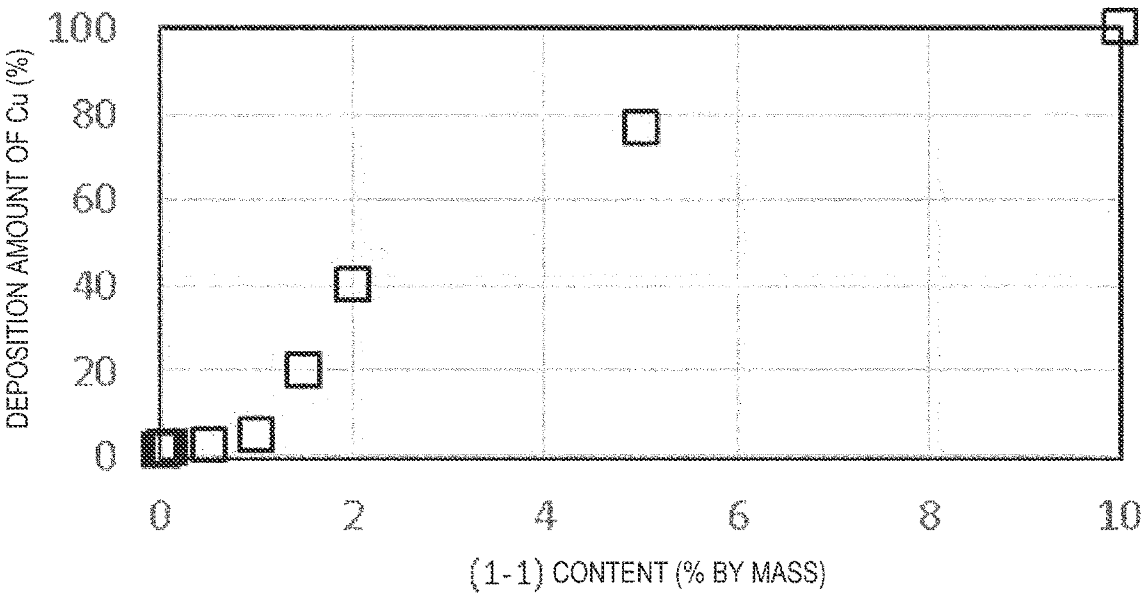
FIG. 9 shows a deposition amount of a negative electrode current collector metal (Cu) on the surface of the negative electrode with respect to the content of Compound (1-1) as the (III) component (Examples 9-1 to 9-7 and Comparative Examples 9-1 to 9-4).

As shown in Table 11, nonaqueous electrolytic solution batteries were produced in the same manner as in Examples 7-1 to 7-7 and Comparative Examples 7-1 to 7-4, except for using the $SiO_x$ negative electrode as the negative electrode, and the same evaluations were performed. Evaluation results are shown in Table 11 and FIG. 9.

It is noted that when producing the battery, the amounts of the NMC111 positive electrode active material and the $SiO_x$ powder were adjusted such that the charging capacity of the $SiO_x$ negative electrode is larger than a charging capacity of the NMC111 positive electrode, and the applied amount was also adjusted such that a lithium metal does not deposit on the $SiO_x$ negative electrode during charging.

TABLE 11

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 9-1 | (1-1)-0.005-(0) | NCM111 | $SiO_x$ | 1.70 | 100 | 103 | 97 |
| Example 9-2 | (1-1)-0.01-(0) | | | 1.72 | 101 | 109 | 94 |
| Example 9-3 | (1-1)-0.05-(0) | | | 1.89 | 101 | 117 | 81 |
| Example 9-4 | (1-1)-0.1-(0) | | | 2.03 | 103 | 128 | 71 |
| Example 9-5 | (1-1)-0.5-(0) | | | 2.41 | 105 | 136 | 66 |
| Example 9-6 | (1-1)-1.0-(0) | | | 4.89 | 103 | 133 | 69 |
| Example 9-7 | (1-1)-1.5-(0) | | | 20.1 | 100 | 128 | 72 |
| Comparative Example 9-1 | (1-1)-2.0-(0) | | | 39.9 | 98 | 119 | 79 |
| Comparative Example 9-2 | (1-1)-5.0-(0) | | | 76.5 | 91 | 108 | 91 |
| Comparative Example 9-3 | (1-1)-10.0-(0) | | | 100 | 86 | 101 | 98 |

TABLE 11-continued

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Comparative Example 9-4 | (0)-(0) | | | 1.69 | 100 | 100 | 100 |

(*) Relative value when deposition amount of Cu in Comparative Example 9-3 was set to 100.
(**) Relative value when value of Comparative Example 9-4 was set to 100.

[Examples 10-1 to 10-7] [Comparative Examples 10-1 to 10-4]

Figure 10:
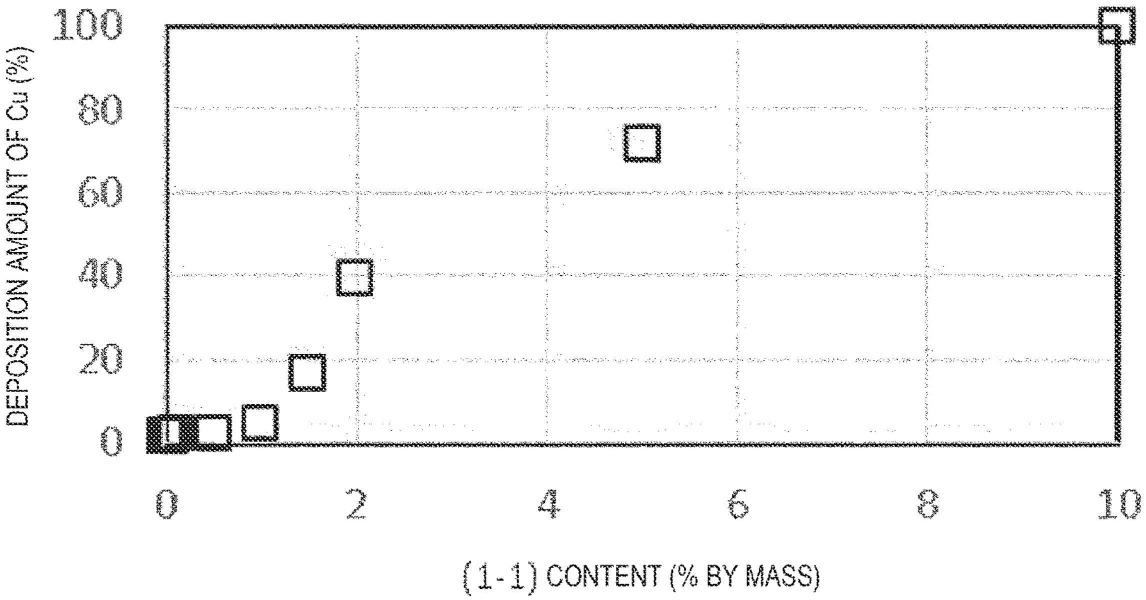
FIG. 10 shows a deposition amount of a negative electrode current collector metal (Cu) on the surface of the negative electrode with respect to the content of Compound (1-1) as the (II) component (Examples 10-1 to 10-7 and Comparative Examples 10-1 to 10-4).

As shown in Table 12, nonaqueous electrolytic solution batteries were produced in the same manner as in Examples 8-1 to 8-7 and Comparative Examples 8-1 to 8-4, except for using the $SiO_x$ negative electrode as the negative electrode, and the same evaluations were performed. Evaluation results are shown in Table 12 and FIG. 10.

It is noted that when producing the battery, the amounts of the NMC111 positive electrode active material and the $SiO_x$ powder were adjusted such that the charging capacity of the $SiO_x$ negative electrode is larger than a charging capacity of the NMC111 positive electrode, and the applied amount was also adjusted such that a lithium metal does not deposit on the $SiO_x$ negative electrode during charging.

TABLE 12

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 10-1 | (1-1)-0.005-(2-7)-1.0 | NCM111 | $SiO_x$ | 1.73 | 100 | 101 | 99 |
| Example 10-2 | (1-1)-0.01-(2-7)-1.0 | | | 1.75 | 100 | 105 | 96 |
| Example 10-3 | (1-1)-0.05-(2-7)-1.0 | | | 1.87 | 101 | 114 | 91 |
| Example 10-4 | (1-1)-0.1-(2-7)-1.0 | | | 2.11 | 101 | 121 | 87 |
| Example 10-5 | (1-1)-0.5-(2-7)-1.0 | | | 2.38 | 102 | 130 | 81 |
| Example 10-6 | (1-1)-1.0-(2-7)-1.0 | | | 4.91 | 101 | 127 | 84 |
| Example 10-7 | (1-1)-1.5-(2-7)-1.0 | | | 16.4 | 100 | 121 | 88 |
| Comparative Example 10-1 | (1-1)-2.0-(2-7)-1.0 | | | 39.1 | 99 | 113 | 92 |
| Comparative Example 10-2 | (1-1)-5.0-(2-7)-1.0 | | | 71.8 | 94 | 105 | 96 |
| Comparative Example 10-3 | (1-1)-10.0-(2-7)-1.0 | | | 100 | 87 | 97 | 102 |
| Comparative Example 10-4 | (0)-(2-7)-1.0 | | | 1.71 | 100 | 100 | 100 |

(*) Relative value when deposition amount of Cu in Comparative Example 10-3 was set to 100.
(**) Relative value when value of Comparative Example 10-4 was set to 100.

From the above results, even when the type of positive electrode or negative electrode was changed, and the nonaqueous electrolytic solution according to the present disclosure was applied to the positive electrode having the content of nickel of 30% by mass to 100% by mass in the metal contained in the positive electrode active material, the effect of improving the output characteristics after cycle and the effect of reducing the deposition amount of the negative electrode current collector metal on the surface of the negative electrode after the initial charging and discharging can also be exerted in a well-balanced manner. The nonaqueous electrolytic solution battery including the nonaqueous electrolytic solution, the negative electrode, and the positive electrode having the content of nickel of 20% by mass to 100% by mass in the metal contained in the positive electrode active material can exert, in a well-balanced manner, the effect of improving the output characteristics after cycle and the effect of reducing the deposition amount of the negative electrode current collector metal on the surface of the negative electrode after the initial charging and discharging.

<Preparation of Electrolytic Solutions in Table 13>

Electrolytic solutions described in Table 13 were prepared in the same procedure as in the preparation of the electrolytic solutions shown in Table 1 except that lithium difluorobis (oxalato)phosphate (hereinafter, sometimes described as “DFBOP”) as another additive was further dissolved so as to be 1.0% by mass with respect to the total amount of the electrolytic solution.

TABLE 13

| Electrolytic solution No. | (I) Nonaqueous solvent | (II) Solute Type | (II) Solute Content [mol/L] | (III) Compound of General Formula [1] Type | (III) Compound of General Formula [1] Content [% by mass] | Another additive Type | Another additive Content [% by mass] |
|---|---|---|---|---|---|---|---|
| (1-1)-0.1-(DFBOP)-1.0 | BC:EMC = 1:2 (volume ratio) | LiPF6 | 1.0 | (1-1) | 0.1 | DFBOP | 1.0 |
| (1-1)-0.5-(DFBOP)-1.0 | | | | | 0.5 | | |
| (1-1)-1.0-(DFBOP)-1.0 | | | | | 1.0 | | |
| (1-1)-1.5-(DFBOP)-1.0 | | | | | 1.5 | | |
| (1-1)-5.0-(DFBOP)-1.0 | | | | | 5.0 | | |
| (1-1)-10.0-(DFBOP)-1.0 | | | | | 10.0 | | |
| (0)-(DFBOP)-1.0 | | | | None | — | | |

[Examples 11-1 to 11-4] [Comparative Examples 11-1 to 11-3]

Figure 11:
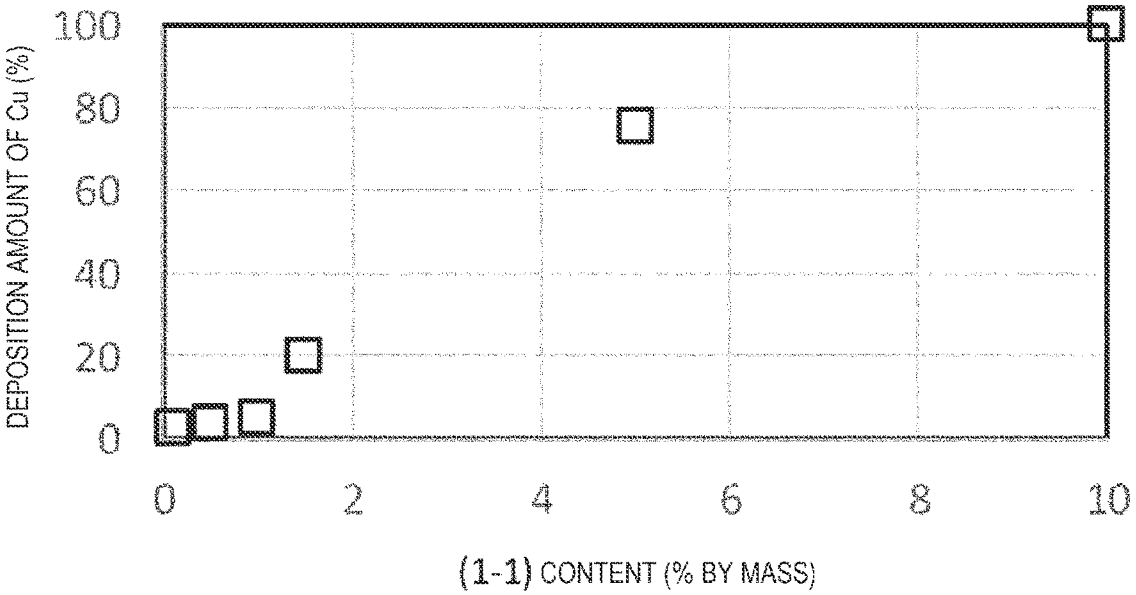
FIG. 11 shows a deposition amount of a negative electrode current collector metal (Cu) on the surface of the negative electrode with respect to the content of Compound (1-1) as the (III) component (Examples 11-1 to 11-4 and Comparative Examples 11-1 to 11-3).

Nonaqueous electrolytic solution batteries were produced in the same manner as in Example 1-1, except that electrolytic solutions listed in Electrolytic solution No. in Table 14 were used instead of the electrolytic solution No. (1-1)-0.005-(0), and the same evaluations were performed. Evaluation results are shown in Table 14 and FIG. 11.

TABLE 14

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 11-1 | (1-1)-0.1-(DFBOP)-1.0 | NCM622 | Graphite | 2.41 | 100 | 110 | 87 |
| Example 11-2 | (1-1)-0.5-(DFBOP)-1.0 | | | 3.99 | 103 | 116 | 85 |
| Example 11-3 | (1-1)-1.0-(DFBOP)-1.0 | | | 5.01 | 102 | 120 | 81 |
| Example 11-4 | (1-1)-1.5-(DFBOP)-1.0 | | | 19.8 | 100 | 115 | 84 |
| Comparative Example 11-1 | (1-1)-5.0-(DFBOP)-1.0 | | | 75.2 | 93 | 108 | 91 |
| Comparative Example 11-2 | (1-1)-10.0-(DFBOP)-1.0 | | | 100 | 88 | 101 | 99 |
| Comparative Example 11-3 | (0)-(DFBOP)-1.0 | | | 1.05 | 100 | 100 | 100 |

(*) Relative value when deposition amount of Cu in Comparative Example 11-2 was set to 100.
(**) Relative value when value of Comparative Example 11-3 was set to 100.

<Preparation of Electrolytic Solutions Described in Table 15>

Electrolytic solutions described in Table 15 were prepared in the same procedure as in the preparation of the electrolytic solutions shown in Table 1 except that lithium tetrafluoro oxalato phosphate (hereinafter, sometimes described as "TFOP") as another additive was further dissolved so as to be 1.0% by mass with respect to the total amount of the electrolytic solution.

TABLE 15

| Electrolyte solution No. | (I) Nonaqueous solvent | (II) Solute Type | (II) Solute Content [mol/L] | (III) Compound of General Formula [1] Type | (III) Compound of General Formula [1] Content [% by mass] | Another additive Type | Another additive Content [% by mass] |
|---|---|---|---|---|---|---|---|
| (1-1)-0.1-(TFOP)-1.0 | EC:EMC = 1:2 (volume ratio) | LiPF6 | 1.0 | (1-1) | 0.1 | TFOP | 1.0 |
| (1-1)-0.5-(TFOP)-1.0 | | | | | 0.5 | | |
| (1-1)-1.0-(TFOP)-1.0 | | | | | 1.0 | | |
| (1-1)-1.5-(TFOP)-1.0 | | | | | 1.5 | | |
| (1-1)-5.0-(TFOP)-1.0 | | | | | 5.0 | | |
| (1-1)-10.0-(TFOP)-1.0 | | | | | 10.0 | | |
| (0)-(TFOP)-1.0 | | | | None | — | | |

[Examples 12-1 to 12-4] [Comparative Examples 12-1 to 12-3]

Figure 12:
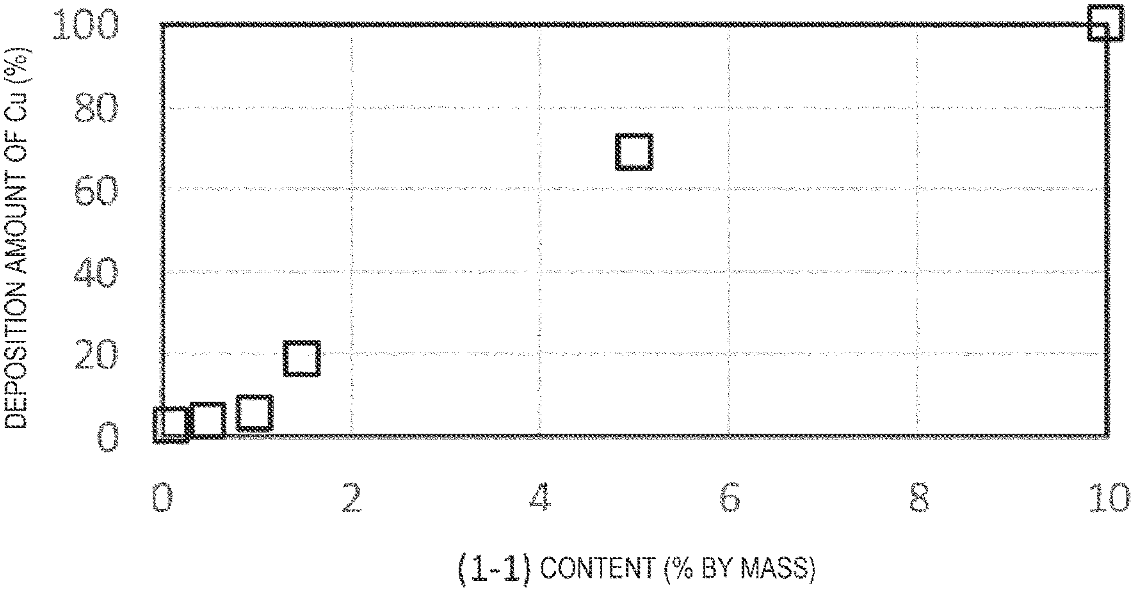
FIG. 12 shows a deposition amount of the negative electrode current collector metal (Cu) on the surface of the negative electrode with respect to the content of Compound (1-1) as the (III) component (Examples 12-1 to 12-4 and Comparative Examples 12-1 to 12-3).

Nonaqueous electrolytic solution batteries were produced in the same manner as in Example 1-1, except that electrolytic solutions listed in Electrolytic solution No. in Table 16 were used instead of the electrolytic solution No. (1-1)-0.005-(0), and the same evaluations were performed. Evaluation results are shown in Table 16 and FIG. 12.

TABLE 16

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 12-1 | (1-1)-0.1-(TFOP)-1.0 | NCM622 | Graphite | 2.35 | 101 | 113 | 87 |
| Example 12-2 | (1-1)-0.5-(TFOP)-1.0 | | | 3.92 | 102 | 123 | 77 |
| Example 12-3 | (1-1)-1.0-(TFOP)-1.0 | | | 5.50 | 101 | 128 | 73 |
| Example 12-4 | (1-1)-1.5-(TFOP)-1.0 | | | 18.9 | 101 | 118 | 82 |
| Comparative Example 12-1 | (1-1)-5.0-(TFOP)-1.0 | | | 68.9 | 91 | 110 | 89 |
| Comparative Example 12-2 | (1-1)-10.0-(TFOP)-1.0 | | | 100 | 82 | 100 | 100 |
| Comparative Example 12-3 | (0)-(TFOP)-1.0 | | | 1.07 | 100 | 100 | 100 |

(*) Relative value when deposition amount of Cu in Comparative Example 12-2 was set to 100.
(**) Relative value when value of Comparative Example 12-3 was set to 100.

<Preparation of Electrolytic Solutions Described in Table 17>

Electrolytic solutions described in Table 17 were produced in the same procedure as in the preparation of the electrolytic solutions shown in Table 1 except that lithium difluoro oxalato borate (hereinafter, sometimes described as "DFOB") as another additive was further dissolved so as to be 1.0% by mass with respect to the total amount of the electrolytic solution.

TABLE 17

| | (I) | (II) Solute | | (III) Compound of General Formula [1] | | Another additive | |
|---|---|---|---|---|---|---|---|
| Electrolytic solution No. | Nonaqueous solvent | Type | Content [mol/L] | Type | Content [% by mass] | Type | Content [% by mass] |
| (1-1)-0.1-(DFOB)-1.0 | EC:EMC = 1:2 (volume ratio) | LiPF6 | 1.0 | (1-1) | 0.1 | DFOB | 1.0 |
| (1-1)-0.5-(DFOB)-1.0 | | | | | 0.5 | | |
| (1-1)-1.0-(DFOB)-1.0 | | | | | 1.0 | | |
| (1-1)-1.5-(DFOB)-1.0 | | | | | 1.5 | | |
| (1-1)-5.0-(DFOB)-1.0 | | | | | 5.0 | | |
| (1-1)-10.0-(DFOB)-1.0 | | | | | 10.0 | | |
| (0)-(DFOB)-1.0 | | | | None | — | | |

[Examples 13-1 to 13-4] [Comparative Examples 13-1 to 13-3]

Figure 13:
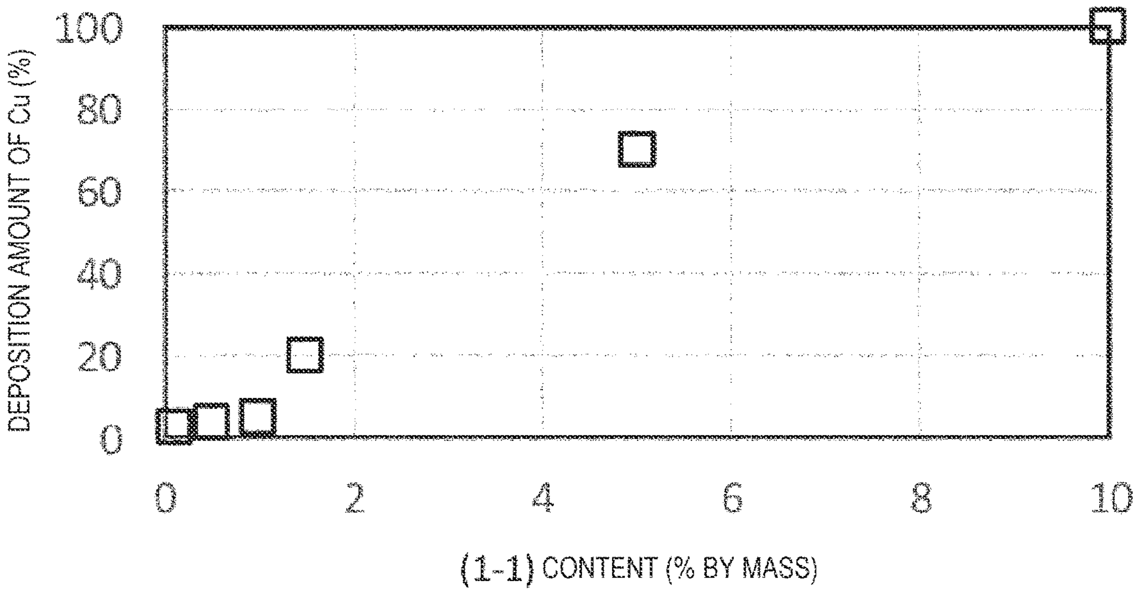
FIG. 13 shows a deposition amount of the negative electrode current collector metal (Cu) on the surface of the negative electrode with respect to the content of Compound (1-1) as the (III) component (Examples 13-1 to 13-4 and Comparative Examples 13-1 to 13-3).

Nonaqueous electrolytic solution batteries were produced in the same manner as in Example 1-1, except that electrolytic solutions listed in Electrolytic solution No. in Table 18 were used instead of the electrolytic solution No. (1-1)-0.005-(0), and the same evaluations were performed. Evaluation results are shown in Table 18 and FIG. 13.

TABLE 18

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 13-1 | (1-1)-0.1-(DFOB)-1.0 | NCM622 | Graphite | 2.45 | 101 | 104 | 97 |
| Example 13-2 | (1-1)-0.5-(DFOB)-1.0 | | | 4.03 | 102 | 113 | 87 |
| Example 13-3 | (1-1)-1.0-(DFOB)-1.0 | | | 5.11 | 102 | 115 | 85 |
| Example 13-4 | (1-1)-1.5-(DFOB)-1.0 | | | 20.1 | 101 | 104 | 98 |
| Comparative Example 13-1 | (1-1)-5.0-(DFOB)-1.0 | | | 70.2 | 92 | 102 | 99 |
| Comparative Example 13-2 | (1-1)-10.0-(DFOB)-1.0 | | | 100 | 79 | 97 | 103 |
| Comparative Example 13-3 | (0)-(DFOB)-1.0 | | | 1.31 | 100 | 100 | 100 |

(*) Relative value when deposition amount of Cu in Comparative Example 13-2 was set to 100.

(**) Relative value when value of Comparative Example 13-3 was set to 100.

From the above results, in the composition with the changed type of additives, even when the nonaqueous electrolytic solution according to the present disclosure is applied to the positive electrode having the content of nickel of 30% by mass to 100% by mass in the metal contained in the positive electrode active material, the effect of improving the output characteristics after cycle and the effect of reducing the deposition amount of the negative electrode current collector metal on the surface of the negative electrode after the initial charging and discharging can also be exerted in a well-balanced manner. The nonaqueous electrolytic solution battery including the nonaqueous electrolytic solution, the negative electrode, and the positive electrode having the content of nickel of 30% by mass to 100% by mass in the metal contained in the positive electrode active material can exert, in a well-balanced manner, the effect of improving the output characteristics after cycle and the effect of reducing the deposition amount of the negative electrode current collector metal on the surface of the negative electrode after the initial charging and discharging.

<Evaluation 5> Amount of Gases Generated During Initial Charging

For the batteries of Example 1-5, 2-5, 11-2, 12-2, and 13-2, an amount of gases generated during initial charging was measured. Specifically, a volume of the cell before and after the initial charging (that is, before and after conditioning) was measured by the Archimedes method, and a difference was calculated. Results are shown in Table 19. In the table, the amount of gases generated during the initial charging was a relative value when the amount of gases generated during the initial charging of the nonaqueous electrolytic solution battery according to Example 1-5 was set to 100. <Evaluations 1 to 3> described together were also relative values when the evaluation results of Example 1-5 were set to 100.

TABLE 19

| | Electrolytic solution No. | Positive electrode active material | Negative electrode active material | Amount of gases generated during initial charging (*) | Capacity retention rate after cycle [%] (*) | Output characteristics after cycle [%] (*) | Resistance value after cycle [%] (*) |
|---|---|---|---|---|---|---|---|
| Example 1-5 | (1-1)-0.5-(0) | NCM622 | Graphite | 100 | 100 | 100 | 100 |
| Example 2-5 | (1-1)-0.5-(2-7)-1.0 | | | 60 | 115 | 103 | 98 |
| Example 11-2 | (1-1)-0.5-(DFBOP)-1.0 | | | 120 | 125 | 128 | 76 |
| Example 12-2 | (1-1)-0.5-(TFOP)-1.0 | | | 60 | 113 | 104 | 97 |
| Example 13-2 | (1-1)-0.5-(DFOB)-1.0 | | | 65 | 108 | 135 | 71 |

(*) Relative value when amount of Example 1-5 was set to 100.

<Preparation of Electrolytic Solutions Described in Table 20>

Electrolytic solutions shown in Table 20 were produced in the same manner as in the preparation of the electrolytic solutions shown in Table 1, except that Compound (1-21) was used as (III).

TABLE 20

| | (I) | (II) Solute | | (III) Compound of General Formula [1] | | Another additive | |
|---|---|---|---|---|---|---|---|
| Electrolytic solution No. | Nonaqueous solvent | Type | Content [mol/L] | Type | Content [% by mass] | Type | Content [% by mass] |
| (1-21)-0.1-(0) | EC:EMC = 1:2 (volume ratio) | LiPF6 | 1.0 | (1-21) | 0.1 | None | — |
| (1-21)-0.5-(0) | | | | | 0.5 | | |
| (1-21)-1.0-(0) | | | | | 1.0 | | |
| (1-21)-1.5-(0) | | | | | 1.5 | | |
| (1-21)-5.0-(0) | | | | | 5.0 | | |
| (1-21)-10.0-(0) | | | | | 10.0 | | |
| (0)-(0) | | | | None | — | | |

effect of reducing the deposition amount of the negative electrode current collector metal on the surface of the negative electrode after the initial charging and discharging can also be exerted in a well-balanced manner. The nonaqueous electrolytic solution battery including the nonaqueous electrolytic solution, the negative electrode, and the positive electrode having the content of nickel of 30% by mass to 100% by mass in the metal contained in the positive electrode active material can exert, in a well-balanced manner, the effect of improving the output characteristics after cycle and the effect of reducing the deposition amount of the negative electrode current collector metal on the surface of the negative electrode after the initial charging and discharging.

[Examples 14-1 to 14-4] [Comparative Examples 14-1 to 14-3]

Figure 14:
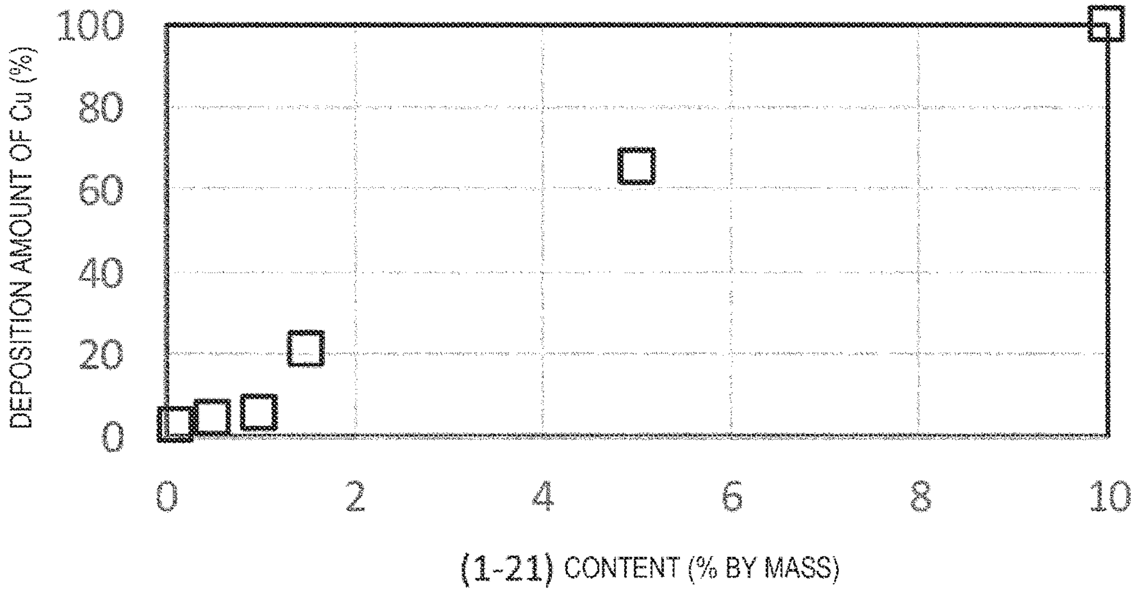
FIG. 14 shows a deposition amount of the negative electrode current collector metal (Cu) on the surface of the negative electrode with respect to a content of Compound (1-21) as the (III) component (Examples 14-1 to 14-4 and Comparative Examples 14-1 to 14-3).

Nonaqueous electrolytic solution batteries were produced in the same manner as in Example 1-1, except that electrolytic solutions listed in Electrolytic solution No. in Table 21 were used instead of the electrolytic solution No. (1-1)-0.005-(0), and the same evaluations were performed. Evaluation results are shown in Table 21 and FIG. 14.

TABLE 21

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 14-1 | (1-21)-0.1-(0) | NCM622 | Graphite | 2.30 | 101 | 144 | 62 |
| Example 14-2 | (1-21)-0.5-(0) | | | 4.35 | 102 | 156 | 60 |
| Example 14-3 | (1-21)-1.0-(0) | | | 5.30 | 101 | 141 | 63 |
| Example 14-4 | (1-21)-1.5-(0) | | | 21.2 | 100 | 130 | 75 |
| Comparative Example 14-1 | (1-21)-5.0-(0) | | | 65.3 | 90 | 115 | 90 |
| Comparative Example 14-2 | (1-21)-10.0-(0) | | | 100 | 79 | 100 | 100 |
| Comparative Example 14-3 | (0)-(0) | | | 1.26 | 100 | 100 | 100 |

(*) Relative value when deposition amount of Cu in Comparative Example 14-2 was set to 100.

(**) Relative value when value of Comparative Example 14-3 was set to 100.

From the above results, in the composition with the changed type of (III) components, even when the nonaqueous electrolytic solution according to the present disclosure is applied to the positive electrode having the content of nickel of 30% by mass to 100% by mass in the metal contained in the positive electrode active material, the effect of improving the output characteristics after cycle and the effect of reducing the deposition amount of the negative electrode current collector metal on the surface of the negative electrode after the initial charging and discharging can also be exerted in a well-balanced manner.

<Preparation of Electrolytic Solutions Described in Table 22>

Electrolytic solutions described in Table 22 were prepared in the same procedure as in the preparation of the electrolytic solutions shown in Table 1 except that Compound (1-21) was used as (III), and DFBOP as an additive was further dissolved so as to be 1.0% by mass with respect to the total amount of the electrolytic solution.

TABLE 22

| Electrolytic solution No. | (I) Nonaqueous solvent | (II) Solute Type | (II) Solute Content [mol/L] | (III) Compound of General Formula [1] Type | (III) Compound of General Formula [1] Content [% by mass] | Another additive Type | Another additive Content [% by mass] |
|---|---|---|---|---|---|---|---|
| (1-21)-0.1-(DFBOP)-1.0 | EC:EMC = 1:2 (volume ratio) | LiPF6 | 1.0 | (1-21) | 0.1 | DFBOP | 1.0 |
| (1-21)-0.5-(DFBOP)-1.0 | | | | | 0.5 | | |
| (1-21)-1.0-(DFBOP)-1.0 | | | | | 1.0 | | |
| (1-21)-1.5-(DFBOP)-1.0 | | | | | 1.5 | | |
| (1-21)-5.0-(DFBOP)-1.0 | | | | | 5.0 | | |
| (1-21)-10.0-(DFBOP)-1.0 | | | | | 10.0 | | |
| (0)-(DFBOP)-1.0 | | | | None | — | | |

[Examples 15-1 to 15-4] [Comparative Examples 15-1 to 15-2 and 11-3]

Figure 15:
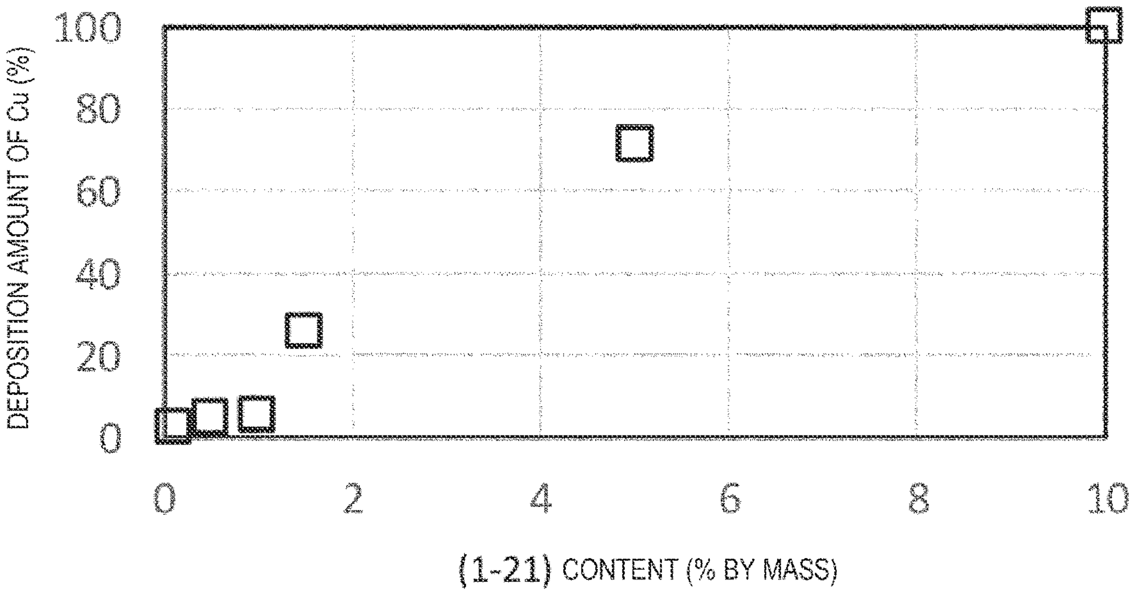
FIG. 15 shows a deposition amount of the negative electrode current collector metal (Cu) on the surface of the negative electrode with respect to the content of Compound (1-21) as the (III) component (Examples 15-1 to 15-4 and Comparative Examples 15-1 to 15-2 and 11-3).

Nonaqueous electrolytic solution batteries were produced in the same manner as in Example 1-1, except that electrolytic solutions listed in Electrolytic solution No. in Table 23 were used instead of the electrolytic solution No. (1-1)-0.005-(0), and the same evaluations were performed. Evaluation results are shown in Table 23 and FIG. 15.

TABLE 23

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 15-1 | (1-2])-0.1-(DFBOP)-1.0 | NCM622 | Graphite | 2.41 | 100 | 112 | 87 |
| Example 15-2 | (1-21)-0.5-(DFBOP)-1.0 | | | 5.03 | 101 | 120 | 82 |
| Example 15-3 | (1-21)-1.0-(DFBOP)-1.0 | | | 5.46 | 102 | 126 | 77 |
| Example 15-4 | (1-21)-1.5-(DFBOP)-1.0 | | | 25.6 | 101 | 117 | 85 |
| Comparative Example 15-1 | (1-21)-5.0-(DFBOP)-1.0 | | | 71.3 | 95 | 109 | 88 |
| Comparative Example 15-2 | (1-21)-10.0-(DFBOP)-1.0 | | | 100 | 83 | 101 | 99 |
| Comparative Example 11-3 | (0)-(DFBOP)-1.0 | | | 2.12 | 100 | 100 | 100 |

(*) Relative value when deposition amount of Cu in Comparative Example 15-2 was set to 100.
(**) Relative value when value of Comparative Example 11-3 was set to 100.

From the above results, in the composition in which the type of (III) component was changed and another additive was further added, even when the nonaqueous electrolytic solution of the present disclosure is applied to the positive electrode having the content of nickel of 30% by mass to 100% by mass in the metal contained in the positive electrode active material, the effect of improving the output characteristics after cycle and the effect of reducing the deposition amount of the negative electrode current collector metal on the surface of the negative electrode after the initial charging and discharging can also be exerted in a well-balanced manner. The nonaqueous electrolytic solution battery including the nonaqueous electrolytic solution, the negative electrode, and the positive electrode having the content of nickel of 30% by mass to 100% by mass in the metal contained in the positive electrode active material can exert, in a well-balanced manner, the effect of improving the output characteristics after cycle and the effect of reducing the deposition amount of the negative electrode current collector metal on the surface of the negative electrode after the initial charging and discharging.

<Preparation of Electrolytic Solutions Described in Table 24>

Electrolytic solutions described in Table 24 were produced in the same procedure as in the preparation of the electrolytic solutions shown in Table 1 except that fluoroethylene carbonate (hereinafter, sometimes described as "FEC") as another additive was further dissolved so as to be 1.0% by mass with respect to the total amount of the electrolytic solution.

TABLE 24

| Electrolytic solution No. | (I) Nonaqueous solvent | (II) Solute Type | (II) Solute Content [mol/L] | (III) Compound of General Formula [1] Type | (III) Compound of General Formula [1] Content [% by mass] | Another additive Type | Another additive Content [% by mass] |
|---|---|---|---|---|---|---|---|
| (1-1)-0.005-(2-2)-1.0 | EC:EMC = 1:2 (volume ratio) | $LiPF_6$ | 1.0 | (1-1) | 0.005 | FEC | 1.0 |
| (1-1)-0.01-(2-2)-1.0 | | | | | 0.01 | | |
| (1-1)-0.05-(2-2)-1.0 | | | | | 0.05 | | |
| (1-1)-0.1-(2-2)-1.0 | | | | | 0.1 | | |

TABLE 24-continued

| Electrolytic solution No. | (I) Nonaqueous solvent | (II) Solute Type | (II) Solute Content [mol/L] | (III) Compound of General Formula [1] Type | (III) Compound of General Formula [1] Content [% by mass] | Another additive Type | Another additive Content [% by mass] |
|---|---|---|---|---|---|---|---|
| (1-1)-0.5-(2-2)-1.0 | | | | | 0.5 | | |
| (1-1)-1.0-(2-2)-1.0 | | | | | 1.0 | | |
| (1-1)-1.5-(2-2)-1.0 | | | | | 1.5 | | |
| (1-1)-2.0-(2-2)-1.0 | | | | | 2.0 | | |
| (1-1)-5.0-(2-2)-1.0 | | | | | 5.0 | | |
| (1-1)-10.0-(2-2)-1.0 | | | | | 10.0 | | |
| (0)-(2-2)-1.0 | | | | None | — | | |

[Examples 16-1 to 16-4] [Comparative Examples 16-1 to 16-3]

Figure 16:
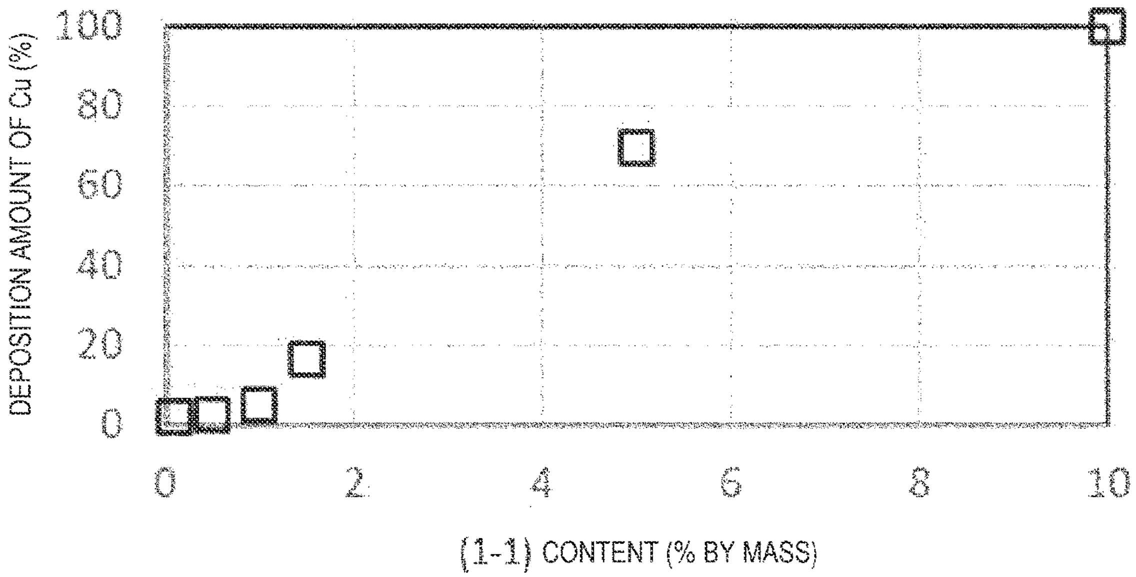
FIG. 16 shows a deposition amount of the negative electrode current collector metal (Cu) on the surface of the negative electrode with respect to the content of Compound (1-1) as the (III) component (Examples 16-1 to 16-4 and Comparative Examples 16-1 to 16-3).

Nonaqueous electrolytic solution batteries were produced in the same manner as in Example 5-1, except that electrolytic solutions listed in Electrolytic solution No. in Table 25 were used instead of the electrolytic solution No. (1-1)-0.005-(0), and the same evaluations were performed. Evaluation results are shown in Table 25 and FIG. 16.

TABLE 25

| | Electrolytic solution No. | Positive electrode active material | Negative electrode active material | Deposition amount of Cu on surface of negative electrode after initial charging and discharging (*) | Capacity retention rate after cycle [%] (**) | Output characteristics after cycle [%] (**) | Resistance value after cycle [%] (**) |
|---|---|---|---|---|---|---|---|
| Example 16-1 | (1-1)-0.1-(2-2)-1.0 | NCM622 | $SiO_x$ | 2.22 | 102 | 125 | 76 |
| Example 16-2 | (1-1)-0.5-(2-2)-1.0 | | | 2.55 | 103 | 133 | 72 |
| Example 16-3 | (1-1)-1.0-(2-2)-1.0 | | | 4.98 | 102 | 126 | 75 |
| Example 16-4 | (1-1)-1.5-(2-2)-1.0 | | | 16.6 | 101 | 119 | 78 |
| Comparative Example 16-1 | (1-1)-5.0-(2-2)-1.0 | | | 69.7 | 96 | 108 | 90 |
| Comparative Example 16-2 | (1-1)-10.0-(2-2)-1.0 | | | 100 | 89 | 101 | 98 |
| Comparative Example 16-3 | (0)-(2-2)-1.0 | | | 1.72 | 100 | 100 | 100 |

(*) Relative value when deposition amount of Cu in Comparative Example 16-2 was set to 100.

(**) Relative value when value of Comparative Example 16-3 was set to 100.

For the batteries of Examples 5-5, 6-5, and 16-2, the amount of gases generated during the initial charging was measured in the same manner as in <Evaluation 5> described above. Results are shown in Table 26. In the table, the amount of gases generated during the initial charging was a relative value when the amount of gases generated during the initial charging of the nonaqueous electrolytic solution battery according to Example 5-5 was set to 100. <Evaluations 1 to 3> described together were also relative values when the evaluation results of Example 5-5 were set to 100.

TABLE 26

| | Electrolytic solution No. | Positive electrode active material | Negative electrode active material | Amount of gases generated during initial charging (*) | Capacity retention rate after cycle [%] (*) | Output characteristics after cycle [%] (*) | Resistance value after cycle [%] (*) |
|---|---|---|---|---|---|---|---|
| Example 5-5 | (1-1)-0.5-(0) | NCM622 | $SiO_x$ | 100 | 100 | 100 | 100 |
| Example 6-5 | (1-1)-0.5-(2-7)-1.0 | | | 64 | 113 | 103 | 98 |
| Example 16-2 | (1-1)-0.5-(2-2)-1.0 | | | 72 | 107 | 108 | 92 |

(*) Relative value when amount of Example 5-5 was set to 100.

From the above results, in the composition in which the type of electrodes was changed and the type of another additive was changed, even when the nonaqueous electrolytic solution according to the present disclosure is applied to the positive electrode having the content of nickel of 30% by mass to 100% by mass in the metal contained in the positive electrode active material, the effect of improving the output characteristics after cycle and the effect of reducing the deposition amount of the negative electrode current collector metal on the surface of the negative electrode after the initial charging and discharging can also be exerted in a well-balanced manner. The nonaqueous electrolytic solution battery including the nonaqueous electrolytic solution, the negative electrode, and the positive electrode having the content of nickel of 30% by mass to 100% by mass in the metal contained in the positive electrode active material can exert, in a well-balanced manner, the effect of improving the output characteristics after cycle and the effect of reducing the deposition amount of the negative electrode current collector metal on the surface of the negative electrode after the initial charging and discharging.

INDUSTRIAL APPLICABILITY

The present disclosure can provide a nonaqueous electrolytic solution in which even if the nonaqueous electrolytic solution is applied to a positive electrode having a content of nickel of 30% by mass to 100% by mass in a metal contained in a positive electrode active material, an effect of improving output characteristics after cycle and an effect of reducing a deposition amount of a negative electrode current collector metal on a surface of a negative electrode after initial charging and discharging can be exerted in a well-balanced manner, and to provide a nonaqueous electrolytic solution battery including the nonaqueous electrolytic solution, the negative electrode, and the positive electrode having the content of nickel of 30% by mass to 100% by mass in the metal contained in the nonaqueous electrolytic solution and the positive electrode active material.

Although the present disclosure has been described in detail and with reference to specific examples, it will be apparent to those skilled in the art that various changes and modifications can be made without departing from the spirit and scope of the present disclosure.

The present application is based on a Japanese Patent Application No. 2020-148320 filed on Sep. 3, 2020, the contents of which are incorporated herein by reference.

The invention claimed is:

1. A nonaqueous electrolytic solution battery comprising:

a positive electrode that contains an oxide containing at least nickel as a positive electrode active material and has a content of nickel is in a range from 30% by mass to 100% by mass in a metal contained in the positive electrode active material;

a negative electrode; and a nonaqueous electrolytic solution, wherein the nonaqueous electrolytic solution comprises:

(I) a nonaqueous solvent;

(II) a solute; and (III) a compound represented by General Formula [1]:

$$R(SO_2X)_m \quad [1],$$

wherein R represents a monovalent group to a tetravalent group, each group containing at least one carbon atom, and each group optionally and independently comprises at least one moiety selected from the group consisting of hydrogen atoms, halogen atoms, unsaturated bonds, aromatic rings, oxygen atoms, and ester bonds, X represents a halogen atom or a linear or branched perfluoroalkyl group having 1 to 10 carbon atoms, and m represents an integer from 1 to 4, and when m represents an integer of 2 to 4, a plurality of X independently is the same or different from each other, wherein a content of (III) is in a range from 0.001% by mass to 1.8% by mass with respect to 100% by mass of a total amount of (I) to (III).

2. The nonaqueous electrolytic solution battery according to claim 1, wherein the content of (III) is in a range from 0.007% by mass to 1.4% by mass with respect to 100% by mass of the total amount of (I) to (III).

3. The nonaqueous electrolytic solution battery according to claim 1, wherein the (III) is at least one compound selected from the group consisting of compounds represented by the following General Formulas [2] to [4]:

$$C(R^1)_{4-a}(SO_2X)_a \quad [2],$$

wherein $R^1$ represents a group selected from the group consisting of a hydrogen atom, a fluorine atom, a linear alkyl group having 1 to 10 carbon atoms, a branched alkyl group having 3 to 10 carbon atoms, an alkenyl group having 2 to 10 carbon atoms, an alkynyl group having 2 to 10 carbon atoms, a cycloalkyl group having 3 to 10 carbon atoms, a cycloalkenyl group having 3 to 10 carbon atoms, an aryl group having 6 to 10 carbon atoms, a linear alkoxy group having 1 to 10 carbon atoms, a branched alkoxy group having 3 to 10 carbon atoms, an alkenyloxy group having 2 to 10 carbon atoms, an alkynyloxy group having 2 to 10 carbon atoms, a cycloalkoxy group having 3 to 10 carbon atoms, a cycloalkenyloxy group having 3 to 10 carbon atoms, an aryloxy group having 6 to 10 carbon atoms, and a group represented by —C(═O)OR$^2$, where R$^2$ represents an alkyl group having 1 to 4 carbon atoms, and the groups each optionally and independently contain at least one moiety selected from the group consisting of fluorine atoms, oxygen atoms, and unsaturated bonds, X represents a halogen atom or a linear or branched perfluoroalkyl group having from 1 to 10 carbon atoms, and a represents an integer from 1 to 4, and when a is 1 or 2, a plurality of —R$^1$ independently is the same or different from each other, when a represents an integer from 2 to 4, a plurality of X may be independently is the same or different from each other, and the carbon atom and the R$^1$ optionally form a multiple bond;

$$(SO_2X)_b(R^3)_{3-b}C—C(R^3)_{3-c}(SO_2X)_c \quad [3]$$

wherein R$^3$ represents a group selected from a hydrogen atom, a fluorine atom, a linear alkyl group having 1 to 10 carbon atoms, a branched alkyl group having 3 to 10 carbon atoms, an alkenyl group having 2 to 10 carbon atoms, an alkynyl group having 2 to 10 carbon atoms, a cycloalkyl group having 3 to 10 carbon atoms, a cycloalkenyl group having 3 to 10 carbon atoms, an aryl group having 6 to 10 carbon atoms, a linear alkoxy group having 1 to 10 carbon atoms, a branched alkoxy group having 3 to 10 carbon atoms, an alkenyloxy group having 2 to 10 carbon atoms, an alkynyloxy group having 2 to 10 carbon atoms, a cycloalkoxy group having 3 to 10 carbon atoms, a cycloalkenyloxy group having 3 to 10 carbon atoms, and an aryloxy group having 6 to 10 carbon atoms, and the groups each optionally and independently contain at least one moiety selected from the group consisting of fluorine atoms, oxygen atoms, and unsaturated bonds, a plurality of R$^3$ independently is the same or different from each other, X represents a halogen atom or a linear or branched perfluoroalkyl group having 1 to 10 carbon atoms, a plurality of X each independently is the same or different, b is 1 or 2, and c is 1 or 2; and $$(SO_2X)_d(R^4)_{2-d}C═C(R^4)_{2-e}(SO_2X)_e \quad [4]$$

wherein R$^4$ represents a group selected from the group consisting of a hydrogen atom, a fluorine atom, a linear alkyl group having 1 to 10 carbon atoms, a branched alkyl group having 3 to 10 carbon atoms, an alkenyl group having 2 to 10 carbon atoms, an alkynyl group having 2 to 10 carbon atoms, a cycloalkyl group having 3 to 10 carbon atoms, a cycloalkenyl group having 3 to 10 carbon atoms, an aryl group having 6 to 10 carbon atoms, a linear alkoxy group having 1 to 10 carbon atoms, a branched alkoxy group having 3 to 10 carbon atoms, an alkenyloxy group having 2 to 10 carbon atoms, an alkynyloxy group having 2 to 10 carbon atoms, a cycloalkoxy group having 3 to 10 carbon atoms, a cycloalkenyloxy group having 3 to 10 carbon atoms, and an aryloxy group having 6 to 10 carbon atoms, and the groups each optionally and independently contain at least one moiety selected from the group consisting of fluorine atoms, oxygen atoms, and unsaturated bonds X represents a halogen atom or a linear or branched perfluoroalkyl group having from 1 to 10 carbon atoms, wherein a plurality of X independently is the same or different from each other, and d is 1 or 2, e is 1 or 2, and when both d and e are 1, a plurality of R$^4$ each independently is the same or different from each other.

4. The nonaqueous electrolytic solution battery according to claim 1, wherein the (III) is at least one compound selected from the group consisting of compounds represented by the Formula (1-1) to Formula (1-22):

(1-1)

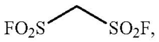

(1-2)

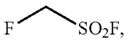

(1-3)

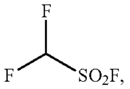

(1-4)

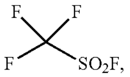

(1-5)

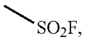

(1-6)

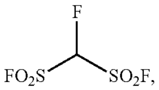

(1-7)

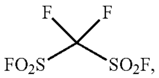

(1-8)

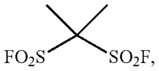

(1-9)

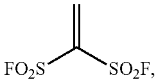

(1-10)

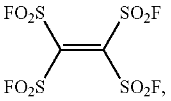

(1-11)

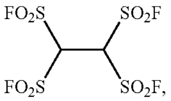

(1-12)

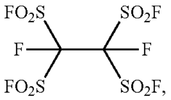

(1-13)

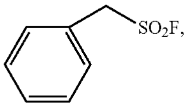

(1-14)

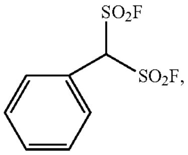

-continued (1-15)

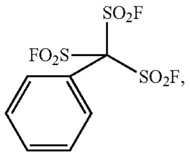

(1-16)

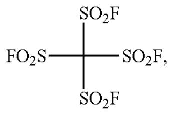

(1-17)

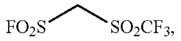

(1-18)

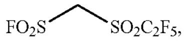

(1-19)

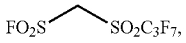

(1-20)

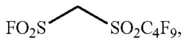

(1-21)

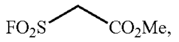

-continued (1-22)

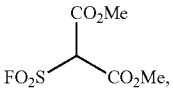

wherein in the Formula (1-1) to Formula (1-22), Me represents a methyl group.

5. The nonaqueous electrolytic solution battery according to claim 3, wherein the (III) is a compound represented by the General Formula [2].

6. The nonaqueous electrolytic solution battery according to claim 1, further comprising:

at least one compound selected from the group consisting of lithium bis (oxalato) borate, lithium difluoro oxalato borate, lithium tris (oxalato) phosphate, lithium difluorobis (oxalato) phosphate, and lithium tetrafluoro oxalato phosphate.

7. The nonaqueous electrolytic solution battery according to claim 1, further comprising:

at least one compound selected from the group consisting of lithium bis (oxalato) borate, lithium difluoro oxalato borate, and lithium tetrafluoro oxalato phosphate.

* * * * *